United States Patent
Park et al.

(10) Patent No.: US 12,442,086 B2
(45) Date of Patent: Oct. 14, 2025

(54) PROCESS CONTROL SYSTEM AND OPERATING METHOD THEREFOR

(71) Applicant: POSCO, Pohang-si (KR)

(72) Inventors: Kyong-Su Park, Pohang-si (KR);
Jung-Hyeung Lee, Pohang-si (KR);
Chon-Kue Kim, Seoul (KR);
Hyoung-Kuk Park, Pohang-si (KR);
Deuk-Jung Kim, Pohang-si (KR)

(73) Assignee: POSCO, Pohang-si (KR)

( * ) Notice: Subject to any disclaimer, the term of this patent is extended or adjusted under 35 U.S.C. 154(b) by 480 days.

(21) Appl. No.: 17/799,839

(22) PCT Filed: Feb. 18, 2021

(86) PCT No.: PCT/KR2021/002056
§ 371 (c)(1),
(2) Date: Aug. 15, 2022

(87) PCT Pub. No.: WO2021/167362
PCT Pub. Date: Aug. 26, 2021

(65) Prior Publication Data
US 2023/0160071 A1 May 25, 2023

(30) Foreign Application Priority Data
Feb. 18, 2020 (KR) .................. 10-2020-0019923

(51) Int. Cl.
*C23F 1/08* (2006.01)
*C23G 3/02* (2006.01)

(52) U.S. Cl.
CPC ............. *C23F 1/08* (2013.01); *C23G 3/025* (2013.01)

(58) Field of Classification Search
CPC .................................. C23F 1/08; C23G 3/025
(Continued)

(56) References Cited

U.S. PATENT DOCUMENTS

| | | |
|---|---|---|
| 3,996,776 A | 12/1976 | Bryant et al. |
| 4,126,510 A | 11/1978 | Moscony et al. |

(Continued)

FOREIGN PATENT DOCUMENTS

| | | |
|---|---|---|
| CN | 1401015 A | 3/2003 |
| CN | 1462321 A | 12/2003 |

(Continued)

OTHER PUBLICATIONS

Takada, Hajime, et al. "Development of an on-line detection system for internal flaws in as-hot-rolled steel strip using ultrasonic probe array." 2002 IEEE Ultrasonics Symposium, 2002. Proceedings.. vol. 1. IEEE, 2002. (Year: 2002).*

(Continued)

*Primary Examiner* — Mohammad Ali
*Assistant Examiner* — Joshua T Sanders
(74) *Attorney, Agent, or Firm* — Morgan Lewis & Bockius LLP

(57) ABSTRACT

A process control system according to one embodiment of the present invention comprises: a first system for generating thickness information about an internal defect layer included in a carbon steel product; and a second system which receives the thickness information about the internal defect layer from the first system through a network, and which controls an etching process for removing at least a part of the internal defect layer from the carbon steel product by using the thickness information about the internal defect layer, wherein the first system provides the second system with a calculation module necessary for the second system to control the etching process, and the second system provides the first system with the information necessary for the first system to update the calculation module.

3 Claims, 14 Drawing Sheets

(58) Field of Classification Search
USPC .......................................................... 700/150
See application file for complete search history.

(56) References Cited

U.S. PATENT DOCUMENTS

| | | | |
|---|---|---|---|
| 4,131,490 A | 12/1978 | Oishi et al. | |
| 6,419,756 B1 * | 7/2002 | Schlechter | C23G 3/02 |
| | | | 266/112 |
| 9,698,062 B2 | 7/2017 | Mauer et al. | |
| 2003/0015259 A1 * | 1/2003 | Bunten | C23G 3/027 |
| | | | 148/509 |
| 2004/0149323 A1 * | 8/2004 | Takeuchi | C23G 1/02 |
| | | | 134/201 |
| 2010/0269854 A1 | 10/2010 | Barbieri et al. | |
| 2016/0318148 A1 | 11/2016 | Turovets | |
| 2022/0074016 A1 * | 3/2022 | Yamamoto | C22C 38/001 |

FOREIGN PATENT DOCUMENTS

| | | |
|---|---|---|
| CN | 101903565 A | 12/2010 |
| CN | 102553950 A | 7/2012 |
| CN | 104942015 A | 9/2015 |
| CN | 105209402 A | 12/2015 |
| CN | 106062930 A | 10/2016 |
| CN | 106521523 A | 3/2017 |
| CN | 107978523 A | 5/2018 |
| CN | 110479776 A | 11/2019 |
| DE | 10062869 A1 | 8/2001 |
| FR | 2321957 A1 | 3/1977 |
| JP | H06-88794 A | 3/1994 |
| JP | 2000-144461 A | 5/2000 |
| JP | 2003-528978 A | 9/2003 |
| JP | 2006-082135 A | 3/2006 |
| JP | 6627609 B2 | 1/2020 |
| KR | 10-2002-0077879 A | 10/2002 |
| KR | 10-2004-0002402 A | 1/2004 |
| KR | 10-0931222 B1 | 12/2009 |
| KR | 10-2010-0001843 A | 1/2010 |
| KR | 10-2010-0102174 A | 9/2010 |
| KR | 10-2011-0047629 A | 5/2011 |
| KR | 10-2016-0037686 A | 4/2016 |
| KR | 10-1966017 B1 | 4/2019 |
| KR | 10-2019-0124019 A | 11/2019 |
| KR | 20190124019 A * | 11/2019 ............... C23G 3/02 |
| WO | WO-2020030913 A1 * | 2/2020 ............. G06N 20/20 |

OTHER PUBLICATIONS

International Search Report dated May 18, 2021 issued in International Patent Application No. PCT/KR2021/002056 (with English translation).
Korean Office Action dated Aug. 10, 2022 issued in Korean Patent Application No. 10-2021-0021682.
Office Action issued Oct. 23, 2023 for counterpart Chinese Patent Application No. 202180015231.8.
Search Report issued Jun. 26, 2023 for counterpart European Patent Application No. 21756800.5.
Chinese Office Action dated May 24, 2024 issued in Chinese Patent Application No. 202180015231.8.
Notice of Allowance dated Jan. 24, 2025, issued in corresponding Chinese Patent Application No. 202180015231.8 with an English translation.
Office Action dated May 14, 2025 issued in corresponding European Patent Application No. 21756800.5.
Office Action dated Jun. 3, 2025 issued in corresponding Japanese Patent Application No. 2024-029478. (Note: JP H06-088794 A, KR 2019-0124019 A, US 2010-0269854 A1, U.S. Pat. No. 4,126,510 A, and U.S. Pat. No. 6,419,756 B1 already submitted.).

* cited by examiner

[FIG. 1]
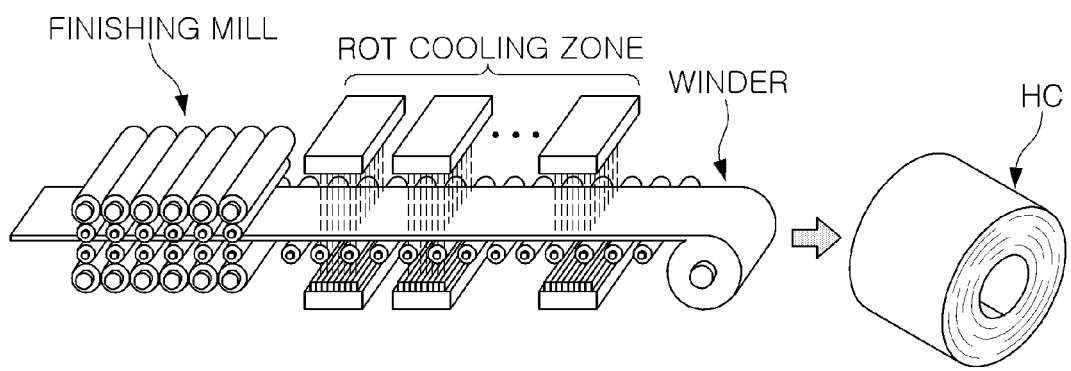
[FIG. 2]
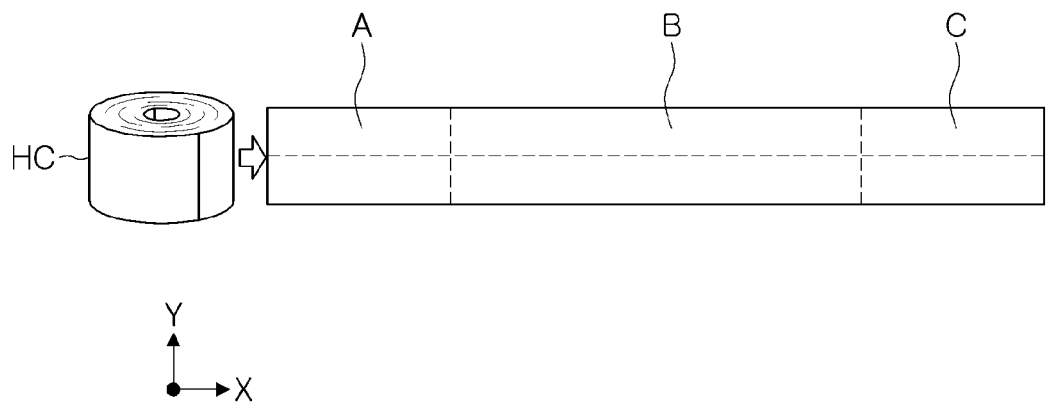

[FIG. 3]
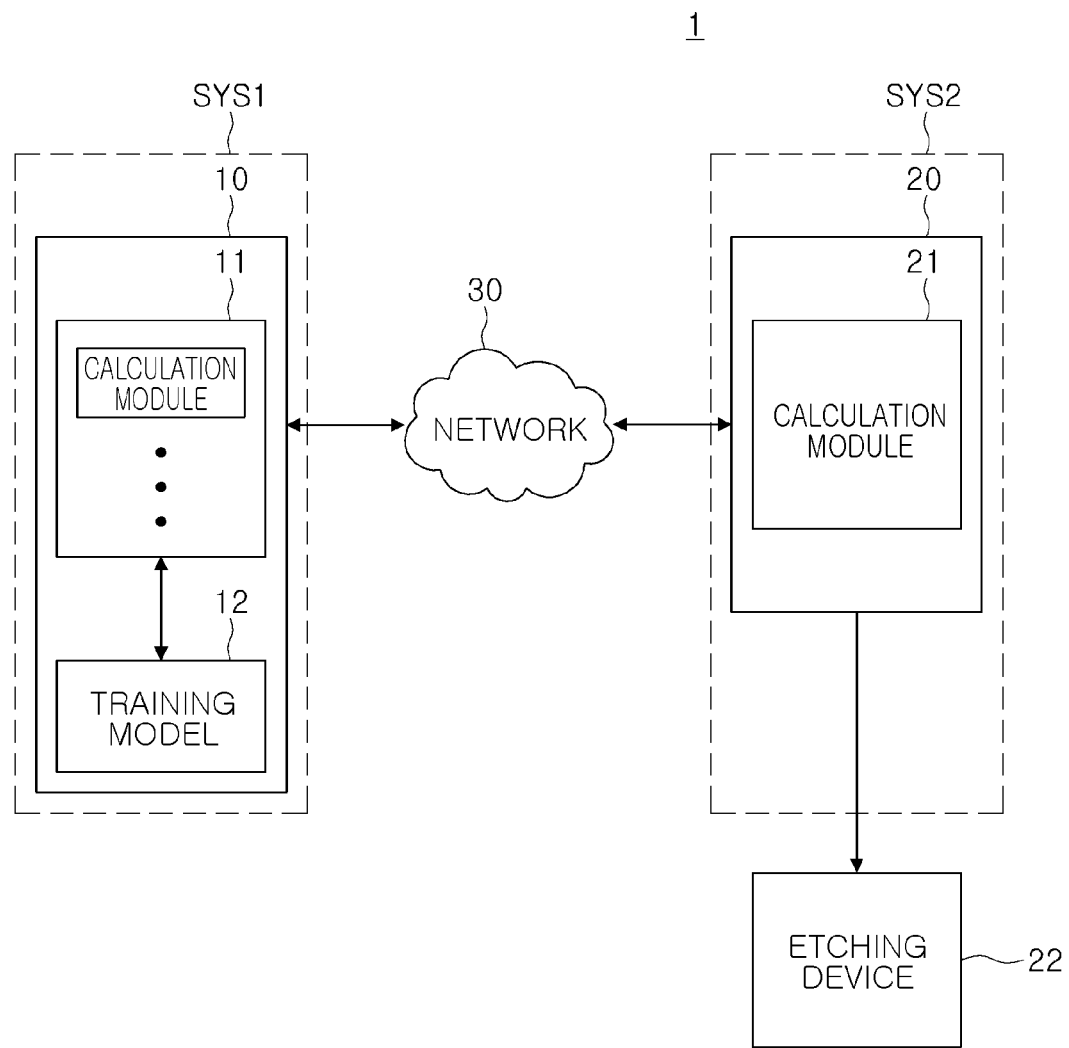

[FIG. 4]
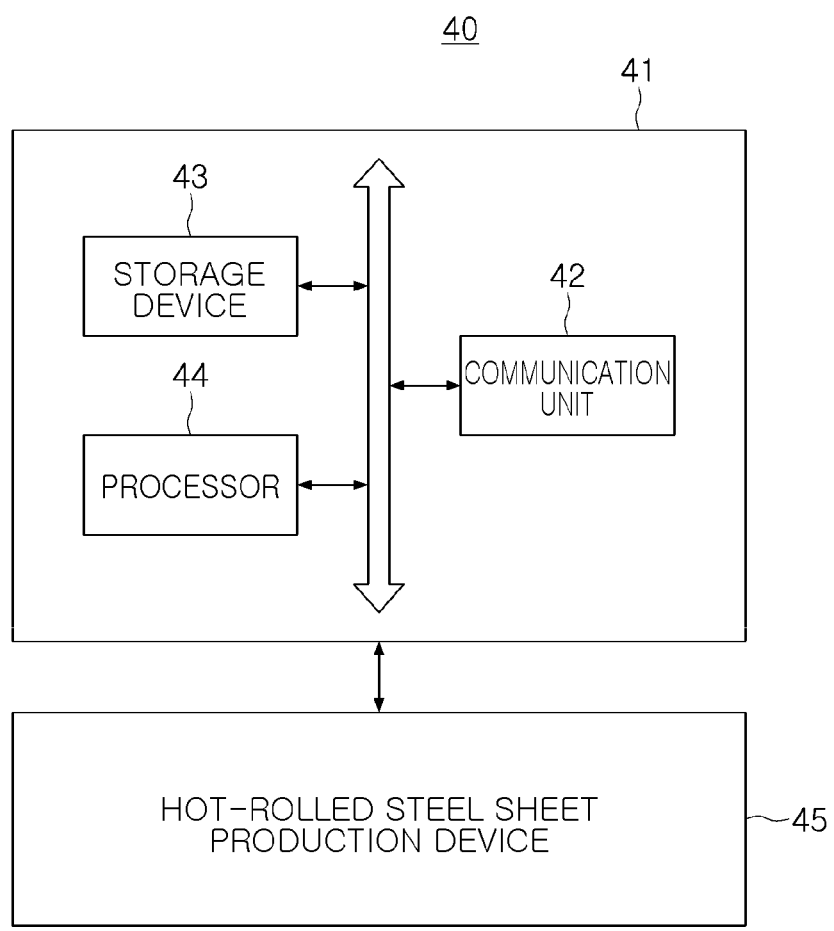

[FIG. 5]
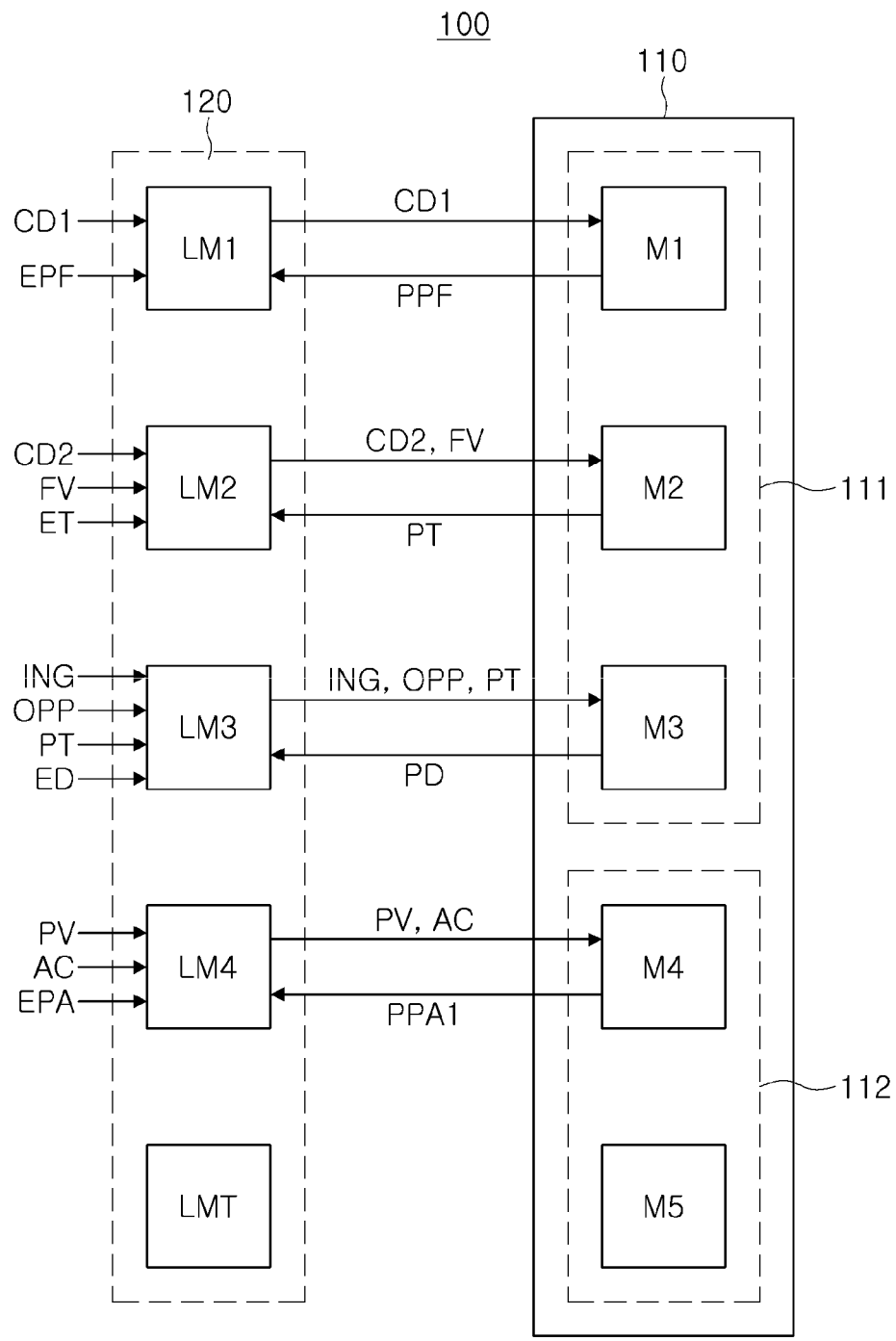

【FIG. 6】
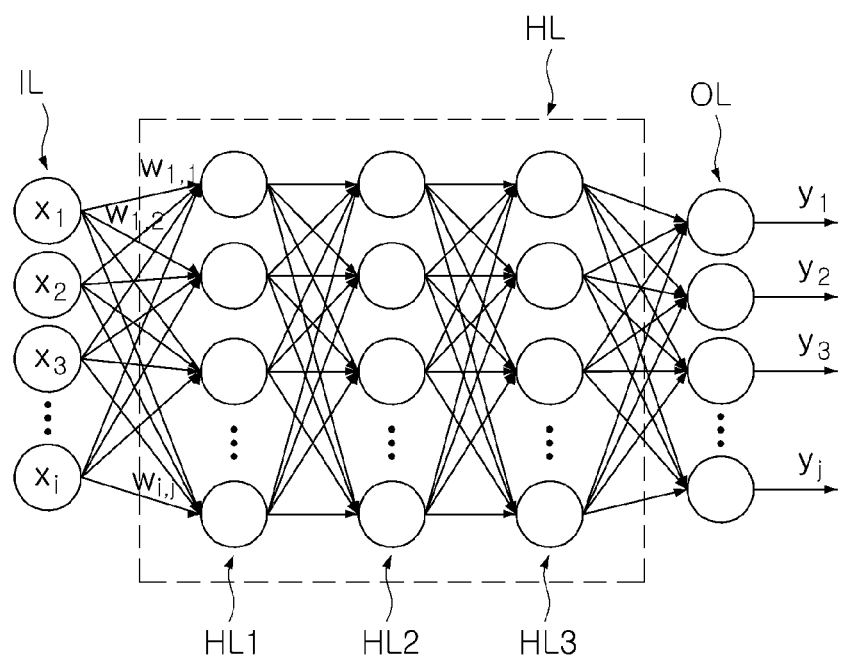

[FIG. 7]
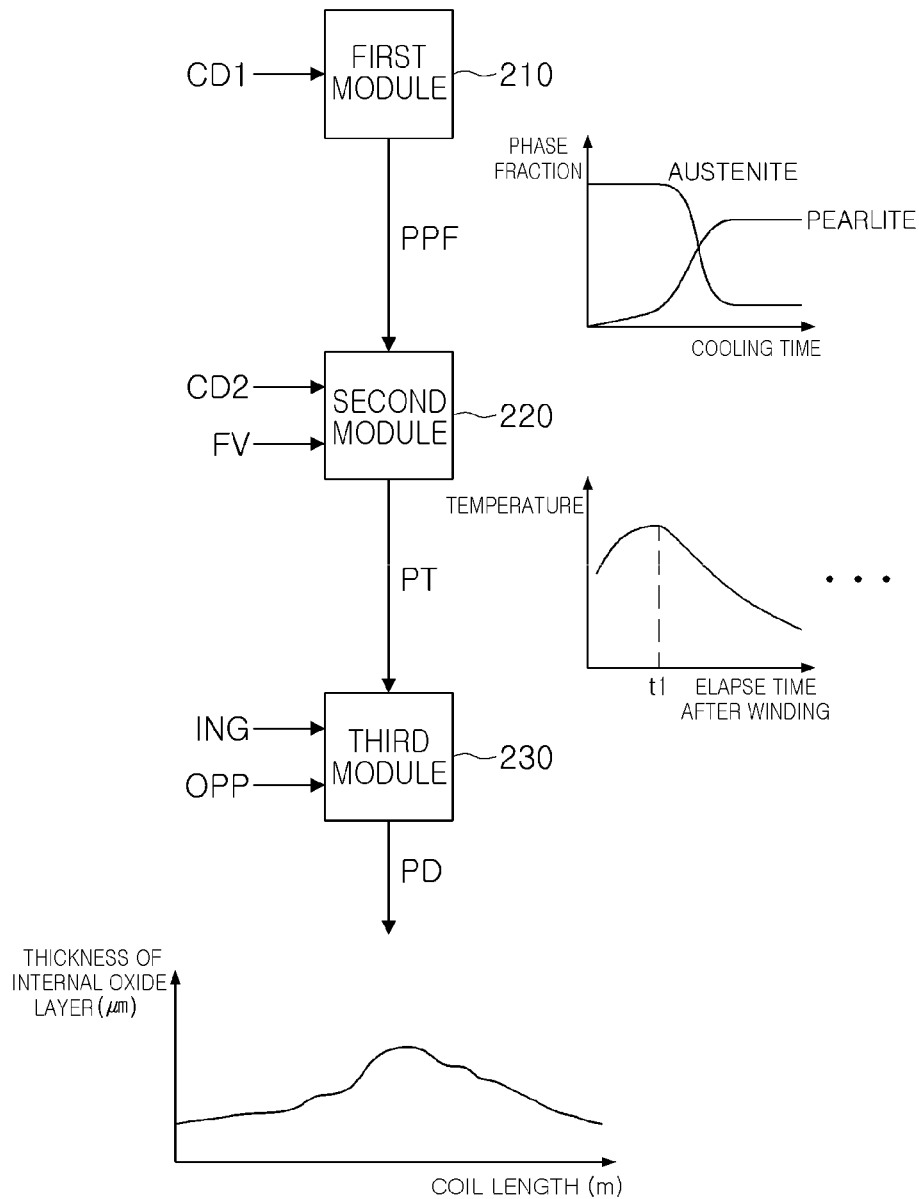

[FIG. 8]
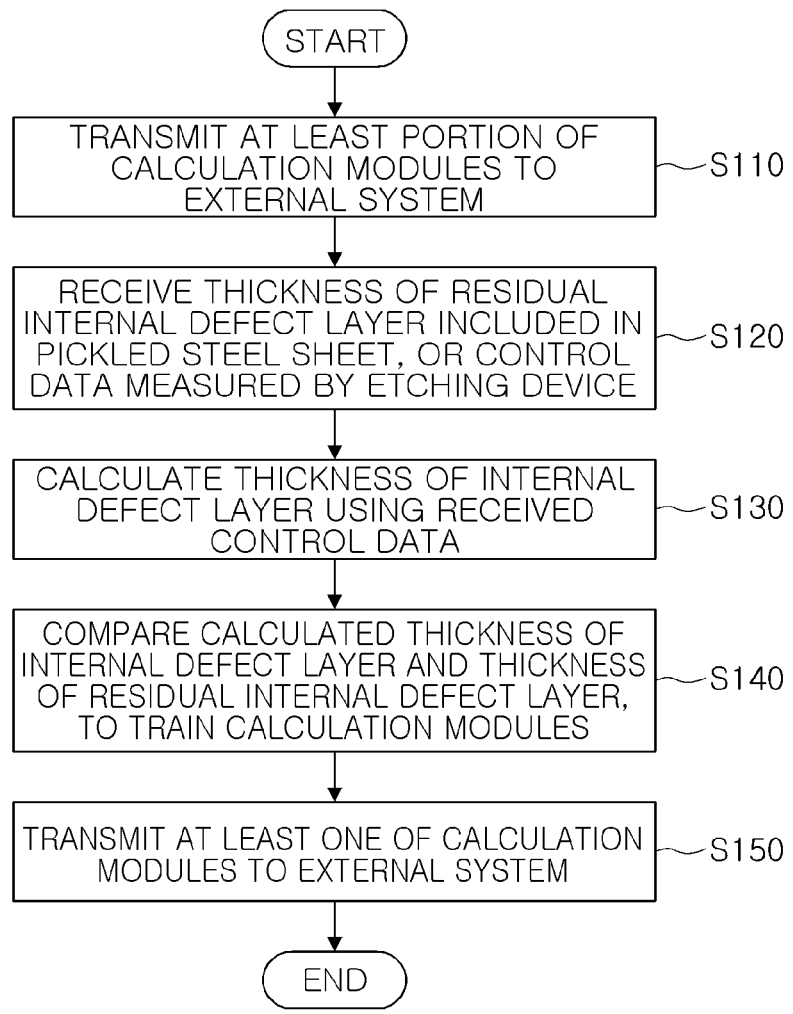

[FIG. 9]
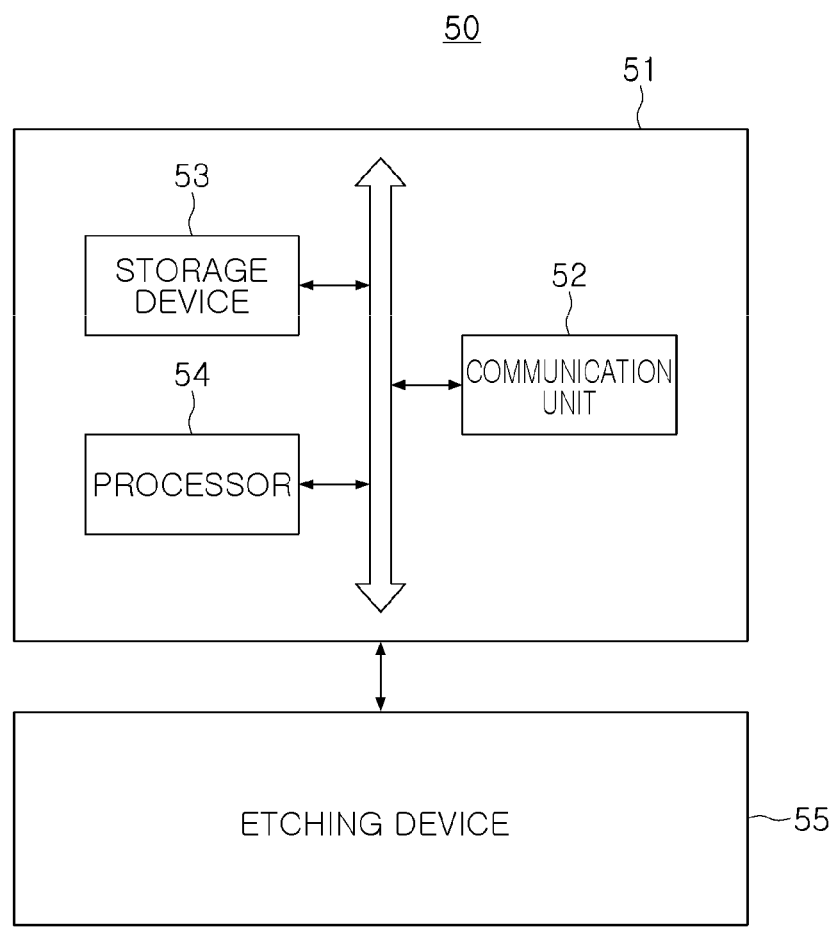

[FIG. 10]
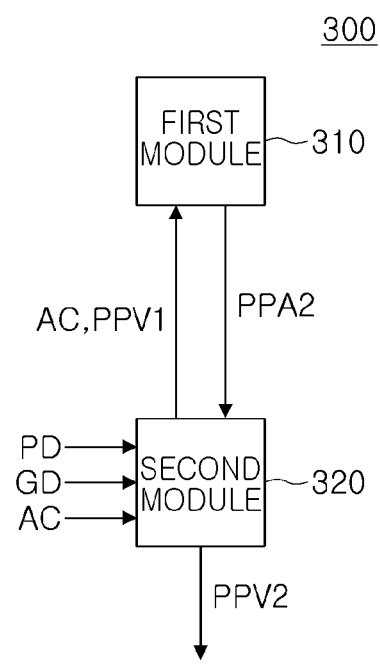

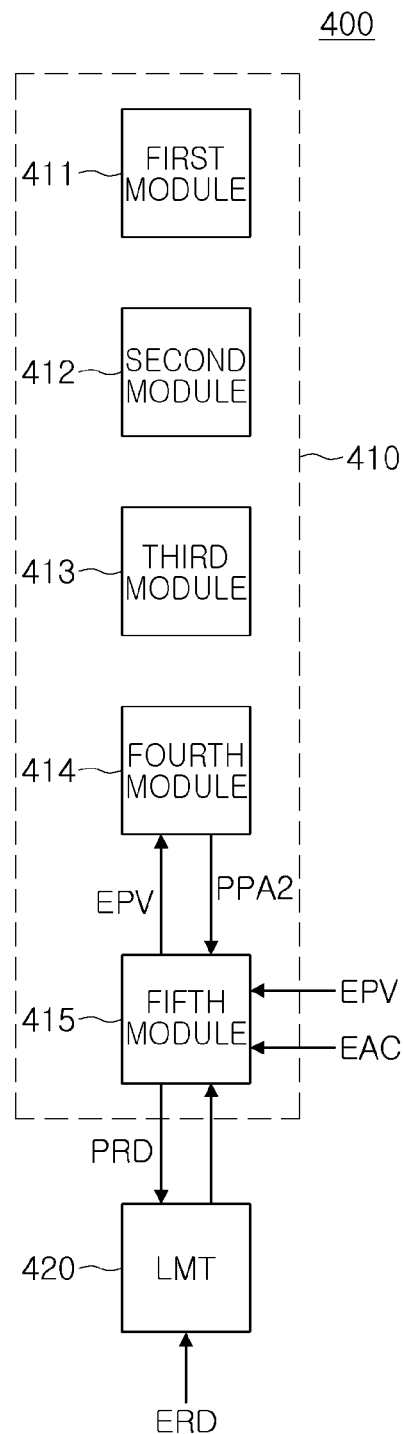

[FIG. 12]
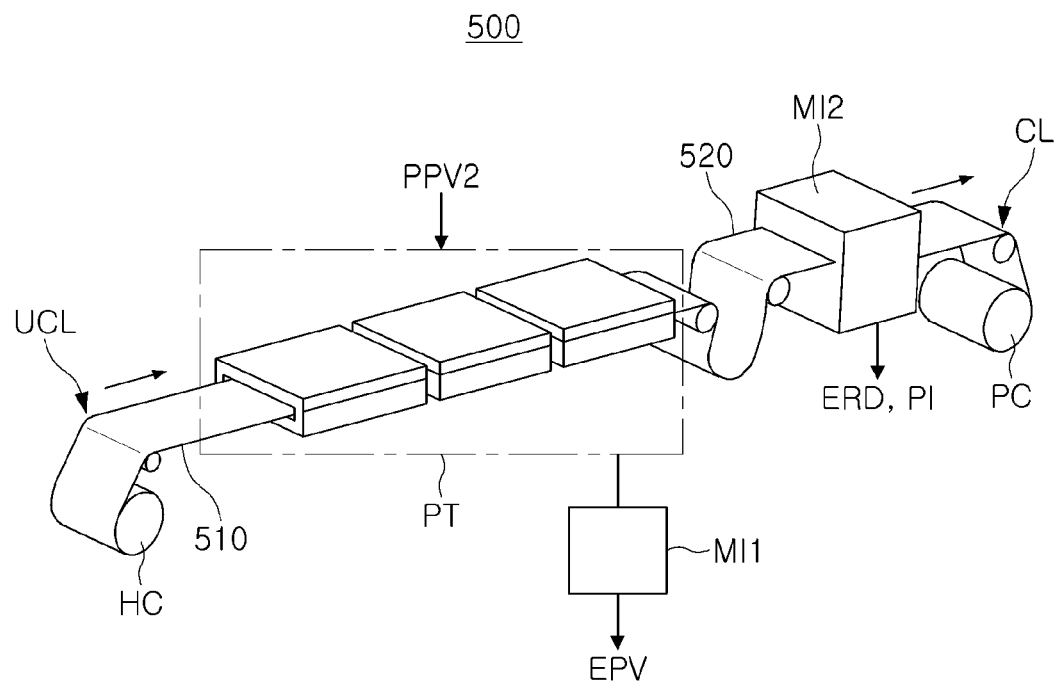
[FIG. 13]
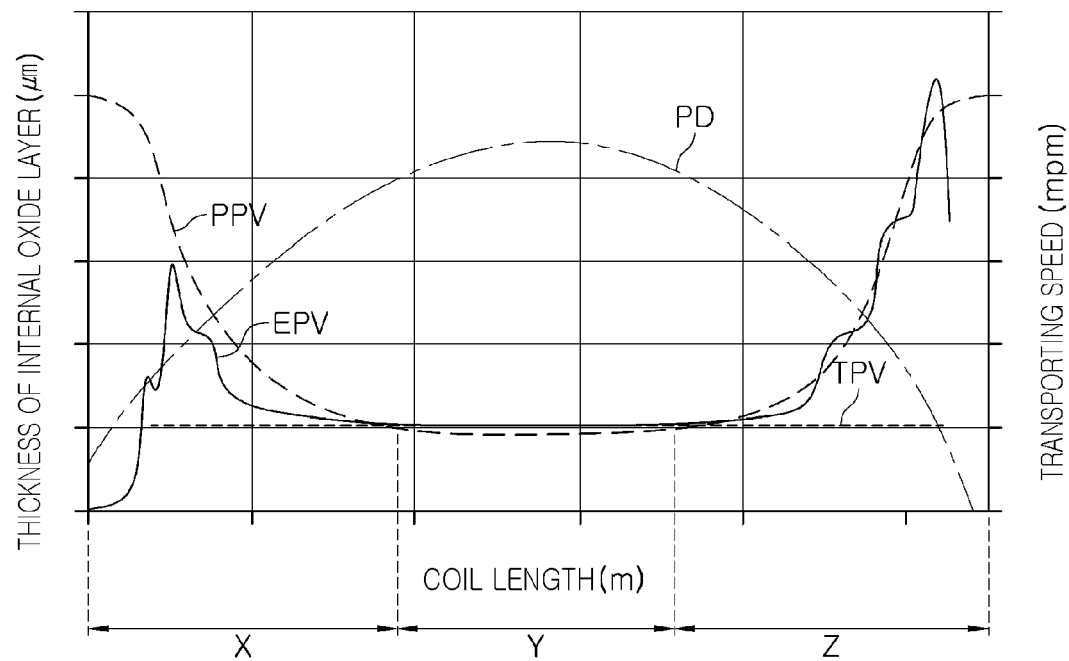

[FIG. 14]
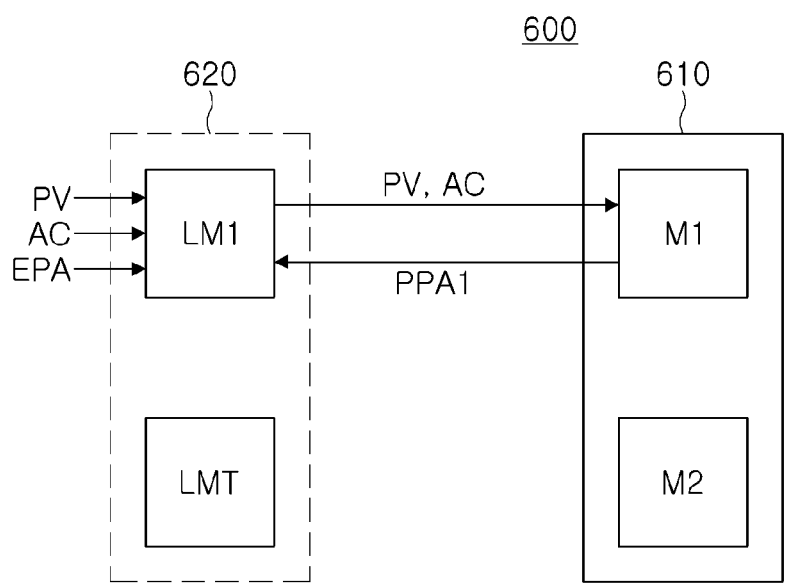
[FIG. 15]
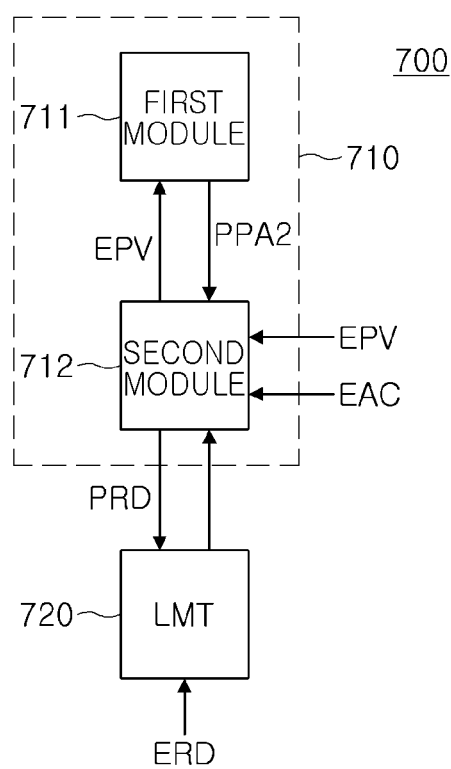

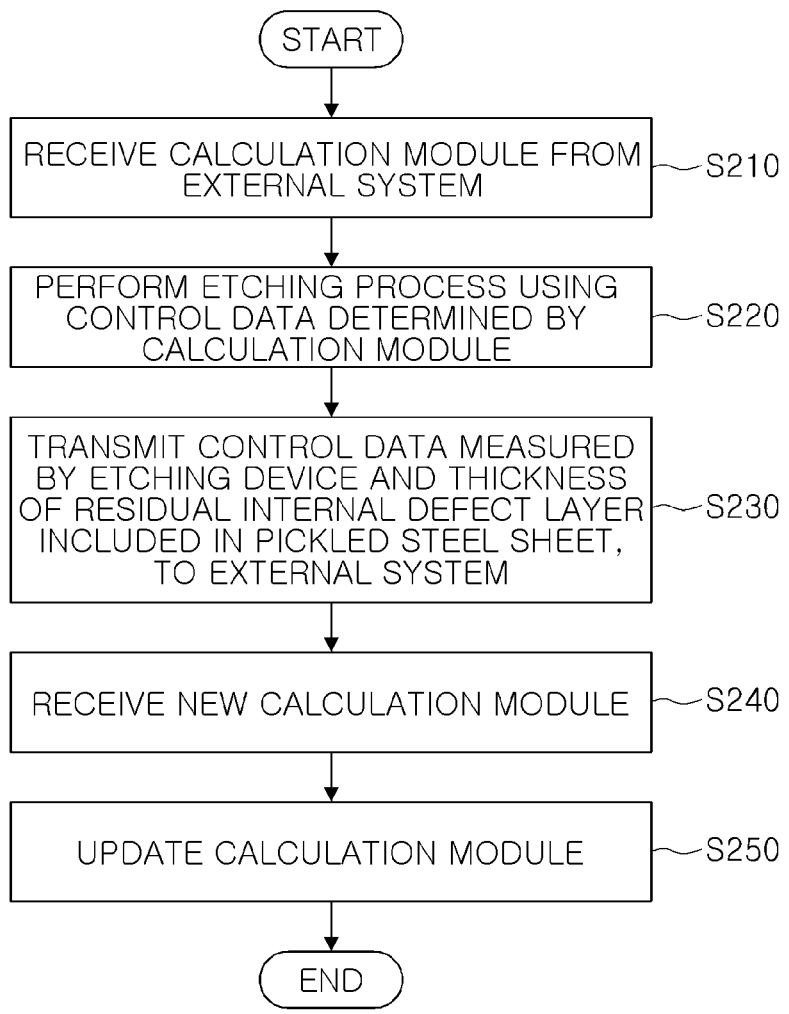
[FIG. 16]

[FIG. 17]
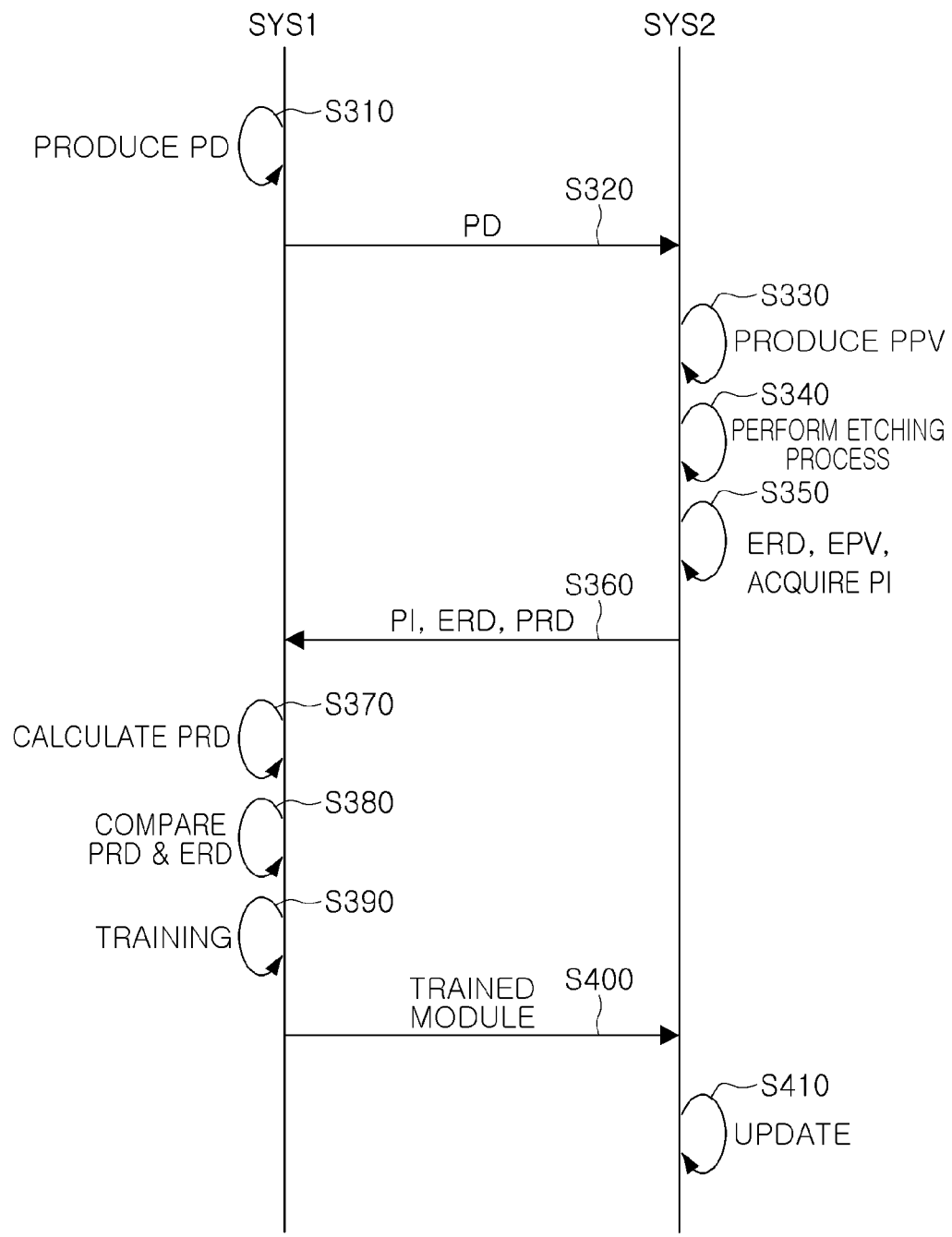

PROCESS CONTROL SYSTEM AND OPERATING METHOD THEREFOR

CROSS-REFERENCE OF RELATED APPLICATIONS

This application is the U.S. National Phase under 35 U.S.C. § 371 of International Patent Application No. PCT/KR2021/002056, filed on Feb. 18, 2021, which in turn claims the benefit of Korean Application No. 10-2020-0019923, filed on Feb. 18, 2020, the entire disclosures of which applications are incorporated by reference herein.

TECHNICAL FIELD

The present disclosure relates to a process control system for controlling a process of removing an internal defect layer included in a carbon steel product, and an operating method thereof.

BACKGROUND ART

A bearing shell or the like for a vehicle, produced using a carbon steel product, may receive continuous and repeated loads on a surface thereof. Therefore, strict surface quality may be required for a carbon steel product used in production of such a bearing shell or the like.

It may be necessary to strictly control a thickness of an internal defect layer and the like included in the carbon steel product, and the internal defect layer may be removed by an etching process or the like. The etching process may be a process of removing the internal defect layer by contacting an etching solution with the carbon steel product.

This prior art can be easily understood with reference to Korean Patent publication No. 10-2019-0124019.

SUMMARY OF INVENTION

Technical Problem

One of the problems to be solved by the technical idea of the present disclosure is to provide a process control system for improving efficiency and productivity of an etching process by controlling the etching process according to a thickness of an internal defect layer included in a carbon steel product, and an operating method thereof.

Solution to Problem

According to an aspect of the present disclosure, a process control system includes a first system generating thickness information about an internal defect layer included in a carbon steel product; and a second system receiving the thickness information about the internal defect layer from the first system through a network, and using the thickness information about the internal defect layer to control an etching process removing at least a portion of the internal defect layer from the carbon steel product, wherein the first system provides the second system with a calculation module necessary for the second system to control the etching process, and the second system provides the first system with information necessary for the first system to update the calculation module.

According to an aspect of the present disclosure, a process control system includes a storage device storing control data necessary for controlling an etching device removing at least a portion of an internal defect layer included in a carbon steel product; and a processor controlling the etching device based on the control data, wherein the carbon steel product includes a first region and a second region, different from the first region, wherein a thickness of the internal defect layer included in the first region is different from a thickness of the inner defect layer included in the second region, and the control data includes a first transporting speed at which the first region passes through the etching device, and a second transporting speed at which the second region passes through the etching device, wherein the first transporting speed is different from the second transporting speed.

According to an aspect of the present disclosure, a process control system includes a storage device storing a calculation module generating thickness information about an internal defect layer included in a carbon steel product, based on at least one of a component, a cooling rate, a phase fraction, or a temperature of the carbon steel product; a communication unit connected to a network; and a processor transmitting at least one of the thickness information about the internal defect layer or control data for controlling an etching process removing at least a portion of the internal defect layer, to an external server controlling the etching process, through the communication unit.

Advantageous Effects of Invention

According to an aspect of the present disclosure, a process control system of improving efficiency and productivity of an etching process and an operating method thereof may be provided by controlling the etching process based on optimal control data, while each of the regions defined in the length direction of the carbon steel product is in contact with the etching solution.

In addition, according to an aspect of the present disclosure, by measuring a thickness of a residual internal defect layer included in a pickled carbon steel product on which an etching process is completed, and training a calculation module generating control data for controlling the etching process using the measured thickness of the residual internal defect layer, the etching process may be performed based on optimized control data.

Various advantages and effects of the present disclosure are not limited to the above, and can be more easily understood in the process of describing specific embodiments of the present disclosure.

BRIEF DESCRIPTION OF DRAWINGS

FIG. 1 is a view illustrating a manufacturing process of a hot-rolled steel sheet according to an embodiment of the present disclosure.

FIG. 2 is a view simply illustrating a hot-rolled steel sheet according to an embodiment of the present disclosure.

FIG. 3 is a block diagram illustrating a process control system according to an embodiment of the present disclosure.

FIG. 4 is a block diagram simply illustrating a process control system according to an embodiment of the present disclosure.

FIG. 5 is a view illustrating an initial training method of a calculation module included in a process control system according to an embodiment of the present disclosure.

FIG. 6 is a view illustrating a training model included in a process control system according to an embodiment of the present disclosure.

FIG. 7 is a view illustrating a method of operating a process control system according to an embodiment of the present disclosure.

FIG. 8 is a flowchart illustrating a method of operating a process control system according to an embodiment of the present disclosure.

FIG. 9 is a block diagram simply illustrating a process control system according to an embodiment of the present disclosure.

FIG. 10 is a view illustrating a method of operating a process control system according to an embodiment of the present disclosure.

FIG. 11 is a view illustrating a training method of a calculation module included in a process control system according to an embodiment of the present disclosure.

FIG. 12 is a view illustrating an etching process according to an embodiment of the present disclosure.

FIG. 13 is a graph illustrating an etching process according to an embodiment of the present disclosure.

FIG. 14 is a view illustrating an initial training method of a calculation module included in a process control system according to an embodiment of the present disclosure.

FIG. 15 is a view illustrating a training method of a calculation module included in a process control system according to an embodiment of the present disclosure.

FIG. 16 is a flowchart illustrating a method of operating a process control system according to an embodiment of the present disclosure.

FIG. 17 is a view illustrating a method of operating a process control system according to an embodiment of the present disclosure.

BEST MODE FOR INVENTION

In the present specification, a carbon steel product may include 0.01% to 2.0% carbon as an alloy of iron and carbon, and representatively, may include a hot-rolled product, a thick plate product, a wire rod product, and the like. For example, the hot-rolled product may be a hot-rolled steel sheet made by hot-rolling a slab, winding the hot-rolled slab to have a coil shape, and cutting the wound coil to have a hot-rolled coil or sheet, and may have a thickness of 1 mm to 25 mm. The thick plate product may be a plate-shaped product made by hot-rolling a slab, and may have a thickness of 4 mm to 200 mm. The wire rod product may be a coil-shaped product having a circular cross-section by co-rolling a billet in a hot state, and may have a cross-sectional diameter of 3 mm to 100 mm.

A process control system of the present disclosure may produce a carbon steel product (hereinafter referred to as a 'pickled carbon steel product') pickled by controlling a transporting speed of the carbon steel product while an etching process for the carbon steel product is in progress. Therefore, surface quality of the carbon steel product may be improved.

Hereinafter, the technical idea of the present disclosure will be described focusing on a hot-rolled steel sheet or a hot-rolled coil in which the hot-rolled steel sheet is wound to have a coil shape. However, the technical spirit of the present disclosure is not limited to the hot-rolled steel sheet or the hot-rolled coil, and may be applied to all carbon steel products within a range easily understood by those skilled in the art.

Hereinafter, preferred embodiments of the present disclosure will be described in detail with reference to the accompanying drawings. The same reference numerals may be used for the same components in the drawings, and duplicate descriptions of the same components will be omitted.

FIG. 1 is a view illustrating a manufacturing process of a hot-rolled steel sheet according to an embodiment of the present disclosure.

FIG. 1 may be a view simply illustrating a hot-rolled steel sheet production device for producing a hot-rolled steel sheet, and cooling and winding the hot-rolled steel sheet to produce a hot-rolled coil. Referring to FIG. 1, a hot-rolling process of rolling a slab heated in a heating furnace to a predetermined thickness using a roughing mill and a finishing mill may be performed. A hot-rolled steel sheet (strip) produced by the hot-rolling process may be transferred to a run-out table (ROT) cooling zone, which may be a cooling section. The hot-rolled steel sheet may be cooled by cooling water sprayed from the ROT cooling zone, and a cooling temperature, a cooling time, or the like may be determined according to quality required for the hot-rolled steel sheet.

After cooling, the hot-rolled steel sheet may be wound to have a coil shape in a winder for convenience of storage and/or movement. A hot-rolled coil (HC), in which a hot-rolled steel sheet is wound to have a coil shape, may be placed in a yard and air-cooled before shipment, and thereafter, an etching process for removing an internal defect layer or the like included in the hot-rolled steel sheet may be performed. In an embodiment, a manufacturing process of a hot-rolled steel sheet, as described with reference to FIG. 1, and an etching process for removing an internal defect layer of the hot-rolled steel sheet may be performed by different entities. Also, in an embodiment, a manufacturing process of a hot-rolled steel sheet and an etching process for removing an internal defect layer of the hot-rolled steel sheet may be performed by a single entity.

FIG. 2 is a view simply illustrating a hot-rolled steel sheet according to an embodiment of the present disclosure.

Referring to FIG. 2, a hot-rolled steel sheet may be divided into a plurality of regions in a length direction (an X-axis direction). For example, the hot-rolled steel sheet may include a region A, a region B, a region C, and the like, which may be sequentially arranged in the length direction. In an embodiment illustrated in FIG. 2, in the hot-rolled steel sheet, region A may be a region firstly wound, and region C may be a region lastly wound. Region B may be a region located between region A and region C in the length direction.

In an embodiment, the hot-rolled steel sheet may include a surface defect. For example, the surface defect may include at least one of a scale or an internal defect layer. The scale may develop during a rolling process, and may exist on a surface of a material. The internal defect layer may be included below the surface of the material, e.g., within the material, and may be defined as an internal oxide layer and/or a decarburization layer. The internal oxide layer may occur in a process of oxidizing a component such as chromium (Cr), manganese (Mn), silicon (Si), zinc (Zn), magnesium (Mg), aluminum (Al), or the like, which may have higher oxygen affinity than iron (Fe), in a base material. The decarburization layer may occur in a process of combining carbon in steel with oxygen in an atmosphere and a scale and then discharging the combined into the atmosphere in a form of gas. A thickness of an internal defect may be changed depending on a component of the hot-rolled steel sheet, a temperature when the hot-rolled steel sheet is wound to be a hot-rolled coil (HC), a cooling time after winding, a width, a thickness, and a length of the hot-rolled steel sheet, or the like. An internal defect, such as the internal defect layer or the like may be a factor in lowering durability of a product produced using the hot-rolled steel sheet.

As an example, a temperature of the wound hot-rolled coil (HC) may be about 500 to 700° C., and the wound hot-rolled coil (HC) may be cooled by air cooling in a state exposed to air. In the hot-rolled coil HC having a wound state, regions A and C exposed externally may be cooled relatively quickly, whereas region B not exposed externally may be cooled relatively slowly. Therefore, a thickness of an internal defect layer included in region B of the hot-rolled steel sheet may be greater than a thickness of an internal defect layer included in each of regions A and C of the hot-rolled steel sheet. Therefore, there may be variations in thickness of an internal defect layer according to a region of the hot-rolled steel sheet. For example, the thickness of the internal defect layer included in region A and/or region C may be less than a predetermined reference thickness, and the thickness of the internal defect layer included in region B may be greater than the reference thickness.

In addition, in a width direction of the hot-rolled steel sheet, a thickness of an internal defect layer may be changed according to a region. For example, regions adjacent to a corner of the hot-rolled steel sheet in the width direction may be cooled relatively quickly, and a difference in thickness of the internal defect layer according to a cooling rate may occur in the width direction as well.

An etching process for removing at least a portion of the internal defect layer may be performed by contacting the hot-rolled steel sheet with an etching solution. For example, the etching process may be performed by transferring the hot-rolled steel sheet in a state in which the hot-rolled steel sheet is immersed in the etching solution accommodated in an etching tank. Alternatively, the etching process may be performed by spraying the etching solution onto a surface of the hot-rolled steel sheet in the etching tank, or brushing the surface of the hot-rolled steel sheet with a brush or the like wetted with the etching solution, or the like. The etching process may be at least one of a pickling process, a dry etching process, or a wet etching process.

For example, the etching process may be performed by sufficiently contacting the hot-rolled steel sheet with the etching solution, regardless of a region of the hot-rolled steel sheet, to sufficiently remove the internal defect layer included in the hot-rolled steel sheet in the etching process. The above method may lead to an increase in time of the etching process and/or an increase in an amount of the etching solution input to the etching process, to reduce productivity.

According to an embodiment of the present disclosure, a thickness of the internal defect layer included in the hot-rolled steel sheet may be calculated and/or measured in the length direction of the hot-rolled steel sheet, and the etching process may be controlled to have optimum efficiency, according to thickness information about the internal defect layer. Therefore, productivity may be improved by shortening a period of the etching process and reducing an amount of the etching solution used. In addition, it is possible to reduce a variation in thickness of the internal defect layer appearing for each region in a pickled steel sheet in which the etching process has completed.

FIG. 3 is a block diagram illustrating a process control system according to an embodiment of the present disclosure.

According to an embodiment of the present disclosure, a process control system 1 may include a first system SYS1 generating thickness information about an internal defect layer included in a hot-rolled coil in which a hot-rolled steel sheet is wound to have a coil shape, and a second system SYS2 using the thickness information about the internal defect layer received from the first system SYS1, to control an etching process of removing at least a portion of the internal defect layer from the hot-rolled steel sheet from which the hot-rolled coil is unwound. Also, the first system SYS1 may provide the second system SYS2 with a calculation module necessary for the second system SYS2 to control the etching process. In addition, the second system SYS2 may provide the first system SYS1 with information necessary for the first system SYS1 to update the calculation module. The first system SYS1 and the second system SYS2 may communicate with each other through a network 30.

Referring to FIG. 3, a process control system 1 according to an embodiment of the present disclosure may be operated by a first entity performing a hot-rolling process and a second entity performing an etching process. In an embodiment, the first entity may produce a hot-rolled steel sheet, and may wind the hot-rolled steel sheet to manufacture a hot-rolled coil, and the second entity may receive the hot-rolled coil from the first entity, and may perform an etching process removing an internal defect layer of the hot-rolled steel sheet. Referring to FIG. 3, the first system SYS1 may be operated by the first entity, and the second system SYS2 may be operated by the second entity. According to embodiments, the first system SYS1 and the second system SYS2 may be operated by a single entity. In this case, the network 30 may be an internal network of an entity operating both the first system SYS1 and the second system SYS2.

Referring to FIG. 3, the first system SYS1 may include a first server 10, and the second system SYS2 may include a second server 20. The first server 10 and the second server 20 may communicate through the network 30, and the second system SYS2 may control an etching device 22 for removing at least a portion of the internal defect layer of the hot-rolled steel sheet.

The network 30 may refer to a wired internet network, a wireless internet network, a wireless local area network (WLAN) such as wireless fidelity (Wi-Fi), or the like. The wired internet network or the wireless internet network may refer to an open computer network structure providing an internet TCP/IP protocol and various services existing in an upper layer thereon, e.g., a hypertext transfer protocol (HTTP), Telnet, a file transfer protocol (FTP), a domain name system (DNS), a simple mail transfer protocol (SMTP), a simple network management protocol (SNMP), a network file service (NFS), a network information service (NIS), or the like.

In an embodiment, the first system SYS1 may generate thickness information about an internal defect layer of a hot-rolled steel sheet produced in a hot-rolling process. The first system SYS1 may transmit the thickness information about the internal defect layer to the second system SYS2 through the network 30. The second system SYS2 may control an etching process performed by the etching device 22 using the thickness information about the internal defect layer received through the network 30.

For example, the first system SYS1 may include a first server 10, and the first server 10 may include a calculation module 11, a training model for training the calculation module 11, and the like. In an embodiment, thickness information about the internal defect layer may be generated by the calculation module 11. The first system SYS1 may generate thickness information by measuring a thickness of the internal defect layer of the hot-rolled steel sheet, or may generate thickness information by calculating a thickness of the internal defect layer of the hot-rolled steel sheet. In an embodiment, the first system SYS1 may calculate the thickness of the internal defect layer using at least one of a component of the hot-rolled steel sheet, a phase fraction of the hot-rolled steel sheet, or a temperature of the hot-rolled steel sheet, to generate the thickness information about the internal defect layer.

The thickness information about the internal defect layer may include a thickness of the internal defect layer included in the hot-rolled steel sheet in each of a plurality of regions defined in the length direction of the hot-rolled steel sheet. Therefore, the thickness information about the internal defect layer may include a thickness distribution of the internal defect layer in the length direction of the hot-rolled steel sheet, or the like.

According to another embodiment, thickness-related information of an internal defect layer may be generated by the calculation module 11. The thickness-related information of the internal defect layer may refer to any type of information acquired by processing thickness information about the internal defect layer, to extract the thickness information about the internal defect layer. When the first system SYS1 transmits thickness-related information of an internal defect layer to the second system SYS2 through the network 30, the second system SYS2 may extract thickness information about the internal defect layer included in the thickness-related information of the internal defect layer received through the network 30, or may calculate thickness information about the internal defect layer from the thickness-related information, and may use the extracted or calculated thickness information about the internal defect layer, to control an etching process performed by the etching device 22.

A calculation module 21 of the second system SYS2 may generate control data necessary for controlling the etching device 22. For example, the calculation module 21 may generate control data using the thickness information about the internal defect layer received from the first system SYS1. The control data may include at least one of a speed at which the etching device 22 transports the hot-rolled steel sheet during the etching process, a concentration of an etching solution contacting the hot-rolled steel sheet in the etching device 22, a component of the etching solution, a temperature of the etching solution, or whether or not an accelerator is used.

The calculation module 21 of the second system SYS2 may receive at least one of the calculation module 11 stored and managed by the first system SYS1. The first system SYS1 may provide the second system SYS2 with a module necessary for controlling the etching device 22 among the calculation module 11. For example, the first system SYS1 may train a module necessary for controlling the etching device 22 using a training model 12, and then provide the module to the second system SYS2. The first system SYS1 may provide a module to the second system SYS2 by a transmission method through the network 30. Alternatively, a module trained by the first system SYS1 may be provided to the second system SYS2 in such a manner that an operator directly inputs and stores the module in the second system SYS2.

The second system SYS2 may provide the first system SYS1 with information necessary for the first system SYS1 to update the calculation module 11. For example, when the etching device 22 completes the etching process for the hot-rolled steel sheet to produce a pickled steel sheet, the second system SYS2 may provide the first system SYS1 with at least one of a thickness of a residual internal defect layer included in the pickled steel sheet, or control data measured by an etching device during the etching process. The first system SYS1 may update the calculation module 11 using at least one of the control data or the thickness of the residual internal defect layer, received from the second system SYS2. As an example, the training model 12 may train the calculation module 11 using at least one of the thickness of the residual internal defect layer or the control data, to update the calculation module 11.

When the calculation module 11 is updated, the first system SYS1 may transmit at least one of an updated calculation module 11 to the second system SYS2 through the network 30. The second system SYS2 may use the calculation module 11 received from the first system SYS1, to update a stored calculation module 21. For example, the second system SYS2 may overwrite an existing calculation module 21 with a calculation module received from the first system SYS1.

In an embodiment, the calculation module 11 of the first system SYS1 may be a plurality of calculation modules. The calculation module 11 may include a calculation module generating thickness information about an internal defect layer included in the hot-rolled steel sheet, a calculation module generating control data controlling the etching device 22, and the like. The first system SYS1 may transmit the calculation module generating the control data to the second system SYS2.

The training model 12 may optimize the calculation module 11. As an example, the training model 12 may include a plurality of training models training the plurality of calculation modules. In addition, the training model 12 may be optimized by training the calculation module 11 using at least one of the thickness of the residual internal defect layer received from the second system SYS2, or the control data. In an embodiment, the training model 12 may train the calculation module 11 such that the thickness of the residual internal defect layer calculated by the calculation module 11 is equal to the thickness of the residual internal defect layer received from the second system SYS2, or a difference therebetween is less than or equal to a predetermined reference value.

The calculation module 11 may be implemented as hardware such as a circuit or the like, or may be implemented as software such as source code or the like. The calculation module 11 may generate an output value by executing a predetermined operation using an input value. As an example, the training model 12 may train the calculation module 11 by adjusting a weight, a coefficient, or the like of the operation executed in the calculation module 11.

According to embodiments, the second server 20 of the second system SYS2 may further include an additional calculation module. The additional calculation module may be a separate calculation module, different from the calculation module 21 received from the first system SYS1, and may adjust at least a portion of control data output by the calculation module 21, to input the adjusted portion to the etching device 22. For example, the additional calculation module may adjust at least a portion of control data output by the calculation module 21 in consideration of a mechanical error, a process delay, or the like existing in the etching device 22, to input the adjusted portion to the etching device 22. Therefore, when the additional calculation module is included in the second server 20, control data output by the calculation module 21 is different from control data input to the etching device 22.

The additional calculation module may adjust a scale unit of control data output by the calculation module 21 such that the control data is applied to the etching device 22, or may convert the control data to a data format that may be input to the etching device 22. In some embodiments, the calculation module 21 may directly adjust a scale unit, a data format, or the like of the control data, to output the same to the etching device 22. In this case, the additional calculation module may not be included in the second server 20.

In an embodiment, the calculation module 21 of the second system SYS2 may receive thickness information about the internal defect layer from the first system SYS1. The thickness information may include a thickness of the internal defect layer calculated and/or measured by the first system SYS1. The second system SYS2 may determine control data for controlling the etching device 22 using the thickness information. In an embodiment, the control data may include a transporting speed at which the etching device 22 transports the hot-rolled steel sheet, a concentration of an etching solution contacting the hot-rolled steel sheet in the etching device 22, a temperature of the etching solution, a component of the etching solution, whether or not an accelerator is used, or the like. The etching device 22 may be automatically controlled by the control data output by the calculation module 21.

For example, control data input to the etching device 22 may optimize an etching process for each of a plurality of regions defined in the length direction of the hot-rolled steel sheet. For example, a transporting speed of the hot-rolled steel sheet during the etching process for some regions close to an end portion of the hot-rolled steel sheet may be different from a transporting speed of the hot-rolled steel sheet during the etching process for some other regions far from the end portion of the hot-rolled steel sheet. For example, the transporting speed of the hot-rolled steel sheet in the etching process for some regions close to the end portion of the hot-rolled steel sheet may be faster than the transporting speed of the hot-rolled steel sheet in the etching process for some other regions far from the end portion of the hot-rolled steel sheet. In an embodiment, a scale present on a surface of the hot-rolled steel sheet may be removed together during the etching process.

In an embodiment, due to a mechanical error existing in the etching device 22, a signal delay in a process or the like of inputting and outputting control data, or the like, control data output by the calculation module 21 and control data measured by the etching device 22 during the etching process may not match each other. When a transporting speed of the hot-rolled steel sheet among control data input to the etching device 22 is described as an example, a transporting speed of the hot-rolled steel sheet input to the etching device 22 by the calculation module 21 and an actual transporting speed for transporting the hot-rolled steel sheet by the etching device 22 may not match. In addition, a concentration of the etching solution and/or a temperature of the etching solution among the control data input to the etching device 23 may be changed while the hot-rolled steel sheet and the etching solution are in contact.

In an embodiment of the present disclosure, the etching device 22 may be controlled in consideration of a mechanical error, a signal delay, or the like. As an example, such that the mechanical error, the signal delay, or the like are reflected in control data, the second system SYS2 may acquire information such as a thickness of a residual internal defect layer included in a pickled steel sheet on which the etching process has been completed, control data measured in the etching device 22 during the etching process, or the like. The second system SYS2 may transmit the acquired information to the first system SYS1.

The training model 12 of the first system SYS1 may train at least one of the calculation module 11 using information transmitted from the second system SYS2. When the training of the calculation module 11 is completed, the first system SYS1 may transmit at least one of the trained calculation module 11, for example, a calculation module generating control data for controlling the etching device 22, to the second system SYS2. The second system SYS2 may use the calculation module received from the first system SYS1, to update the previously stored calculation module 21. Therefore, the calculation module 21 of the second system SYS2 may generate control data in consideration of a mechanical error, a signal delay, or the like, and may more accurately control the etching device 22.

According to embodiments, the second system SYS2 may include a training model. The training model included in the second system SYS2 may train the calculation module 21 included in the second system SYS2, in a similar manner to the training model 12 included in the first system SYS1. This will be described later with reference to FIGS. 14 and 15.

In addition, the second system SYS2 may directly calculate a thickness of the internal defect layer included in the hot-rolled steel sheet, and may perform the etching process using the same. In this case, the second system SYS2 may receive information necessary for calculating the thickness of the internal defect layer, from the first system SYS1. For example, the first system SYS1 may collect information such as a cooling rate of the hot-rolled steel sheet, a component of the hot-rolled steel sheet, an ambient oxygen partial pressure while the hot-rolled steel sheet is cooled, or the like, and may transmit the same to the second system SYS2. The calculation module 21 of the second system SYS2 may predict a thickness of the internal defect layer included in the hot-rolled steel sheet using variables received from the first system SYS1, and may control the etching device 22.

In an embodiment, as described above, while the etching process is in progress, a transporting speed for transporting the hot-rolled steel sheet may be adjusted using a calculated thickness of the internal defect layer. For example, while a first region, in which a thickness of the internal defect layer is predicted to be relatively small, is in contact with the etching solution, the hot-rolled steel sheet may be transported at a first transporting speed. In addition, while a second region, in which a thickness of the internal defect layer is predicted to be relatively large, is in contact with the etching solution, the hot-rolled steel sheet may be transported at a second transporting speed, slower than the first transporting speed.

In an embodiment of the present disclosure, an operation of collecting information for predicting an internal defect layer of the hot-rolled steel sheet, an operation of calculating the internal defect layer, an operation of generating control data for controlling the etching device 22 based on a calculated internal defect layer, an operation of re-training the calculation modules 11 and 21 using the control data collected during the etching process by the etching device 22, or the like may be distributed to and implemented by two different systems (SYS1 and SYS2). For example, the operations may be appropriately distributed to and executed in the first system SYS1 and the second system SYS2, as needed. For example, the operations may be allocated to the first system SYS1 and the second system SYS2 according to performance of the first system SYS1 and performance of the second system SYS2, to efficiently manage load of the systems (SYS1 and SYS2) and effectively operate the entire system 1.

For example, when performance of the first system SYS1 is significantly superior to performance of the second system SYS2, the first system SYS1 may process most of the operations, and the second system SYS2 may receive control data generated by the system SYS1 to control the etching device 22. When performance of the first system SYS1 is similar to performance of the second system SYS2, the first system SYS1 may generate thickness information indicating a thickness of an internal defect layer included in the hot-rolled steel sheet, and the second system SYS2 may generate control data using the thickness information about the internal defect layer. When performance of the second system SYS2 is significantly superior to performance of the first system SYS1, the first system SYS1 may collect information for the hot-rolled steel sheet required to calculate a thickness of the internal defect layer, to transmit the information to the second system SYS2, and the second system SYS2 may calculate a thickness of the internal defect layer, and may generate control data to control the etching device 22.

The information of the hot-rolled steel sheet received from the first system SYS1 in order for the second system SYS2 to predict the thickness of the internal defect layer may include phase fraction-related information of the hot-rolled steel sheet, temperature-related information of the hot-rolled steel sheet, component-related information of the hot-rolled steel sheet), or the like. The phase fraction-related information may refer to all types of information in which phase fraction information is processed to extract the phase fraction information, the temperature-related information of the hot-rolled steel sheet may refer to all types of information in which temperature information is processed to extract the temperature information, and the component-related information of the hot-rolled steel sheet may refer to all types of information in which component information is processed to extract the component information. Therefore, the second system SYS2 may first calculate a phase fraction, a temperature, a component, or the like of the hot-rolled steel sheet using the information received from the first system SYS1, and may then use them to predict a thickness of the internal defect layer included in the hot-rolled steel sheet.

FIG. 4 is a block diagram simply illustrating a process control system according to an embodiment of the present disclosure.

Referring to FIG. 4, a process control system 40 according to an embodiment of the present disclosure may include a first server 41, a hot-rolled steel sheet production device 45, and the like, and the first server 41 may control and manage the hot-rolled steel sheet production device 45. The hot-rolled steel sheet production device 45 may be a device for rolling a slab heated in a heating furnace to produce a hot-rolled steel sheet, and cooling and winding the hot-rolled steel sheet.

The first server 41 may include a communication unit 42, a storage device 43, a processor 44, and the like. The communication unit 42 may connect the first server 41 and a network, to communicate each other. The storage device 43 may store data required for operation of the first server 41, management of the hot-rolled steel sheet production device 45, and the like. The processor 44 may control the communication unit 42, the storage device 43, the hot-rolled steel sheet production device 45, and the like.

For example, the storage device 43 may store a calculation module executing a predetermined operation. In an embodiment, the calculation module may be linked with the hot-rolled steel sheet production device 45, and may use information acquired from the hot-rolled steel sheet production device 45 to generate thickness information about an internal defect layer included in a hot-rolled steel sheet. In addition. The calculation module may generate control data necessary for controlling an etching device by an external system connected through the communication unit 42, the network, and the like. The etching device may be a device for removing at least a portion of the internal defect layer included in the hot-rolled steel sheet produced by the hot-rolled steel sheet production device 45.

For example, the control data may include a transporting speed at which the etching device transports the hot-rolled steel sheet, a temperature, a concentration, or a component of an etching solution contacting the hot-rolled steel sheet in the etching device, whether or not an accelerator is used, or the like. For example, in the thickness information about the internal defect layer generated by the calculation module, a first region of the hot-rolled steel sheet may have an internal defect layer of a first thickness, and the second region may have an internal defect layer of a second thickness, different from the first thickness. The control data may include a first transporting speed at which the hot-rolled steel sheet is transported in an etching process for the first region, and a second transporting speed at which the hot-rolled steel sheet is transported in an etching process for the second region, the first transporting speed may be different from the second transporting speed. For example, when the first thickness is greater than the second thickness, the first transporting speed may be slower than the second transporting speed. Therefore, an etching process may be sufficiently performed for a region having a relatively thick thickness.

In an embodiment, the storage device 43 may store a training model required for training the calculation module. The training model may be executed by the processor 44, and the processor 44 may execute the training model to optimize the calculation module.

The processor 44 may be implemented as a CPU, an AP, an SoC, or the like, and may control the storage device 43, the communication unit 42, the hot-rolled steel sheet production device 45, or the like. For example, the processor 44 may transmit at least one of thickness information about the internal defect layer generated by the calculation module stored in the storage device 43, or control data required for the external system to control the etching device, to the external system.

When the processor 44 transmits thickness information about the internal defect layer to the external system, the external system may directly generate control data for controlling the etching device based on the thickness information about the internal defect layer. In this case, the processor 44 may transmit a calculation module generating the control data using the thickness information about the internal defect layer from the storage device 43, to the external system.

When the processor 44 transmits control data to the external system, the external system may control the etching device using the received control data. As necessary, an additional operation such as converting format of the control data or the like may be executed in the external system. In this case, the processor 44 may not transmit a calculation module generating the control data using the thickness information about the internal defect layer, to the external system.

In an embodiment, the calculation module stored in the storage device 43 may include a first module calculating a phase fraction before winding the hot-rolled steel sheet by the hot-rolled steel sheet production device 45. The first module may calculate the phase fraction, based on at least one of process conditions of the hot-rolled steel sheet, for example, a cooling rate of the hot-rolled steel sheet, a component of the hot-rolled steel sheet, or an initial temperature of the hot-rolled steel sheet. The training model of the storage device 43 may compare a phase fraction actually measured in the hot-rolled steel sheet and a phase fraction predicted by the first module through calculation, to train the first module.

In an embodiment, the calculation module stored in the storage device 43 may further include a second module calculating a change in temperature of the hot-rolled steel sheet. The second module may predict a change in temperature using at least one of the phase fraction calculated by the first module, an elapsed time after winding the hot-rolled steel sheet, or a component of the hot-rolled steel sheet. The training model may compare a change in temperature calculated by the second module and a change in temperature actually measured in the hot-rolled steel sheet, to train the second module.

In an embodiment, the calculation module stored in the storage device 43 may further include a third module calculating a thickness of the internal defect layer included in the hot-rolled steel sheet. For example, the third module may calculate a thickness of the internal defect layer using at least one of a change in temperature calculated by the second module, a component of the hot-rolled steel sheet, or an oxygen partial pressure around the hot-rolled steel sheet. The training model may compare a thickness of the internal defect layer predicted by the third module through calculation and a thickness of the internal defect layer measured from the hot-rolled steel sheet, to train the third module.

For example, the third module may calculate a thickness of the internal defect layer in each of a plurality of regions defined in the length direction of the hot-rolled steel sheet. In at least some of the regions, thicknesses of internal defect layers may be calculated differently.

In an embodiment, the calculation module stored in the storage device 43 may further include a fourth module calculating a thickness of the internal defect layer removed in an etching process of removing at least a portion of the internal defect layer. The fourth module may calculate a thickness of the internal defect layer removed in the etching process, based on control data input to the etching device, to control the etching device performing the etching process.

The training model may compare a thickness of a residual internal defect layer included in a pickled steel sheet on which the etching process is completed and a thickness of the internal defect layer predicted by the fourth module through calculation, to train the fourth module. For example, the training model may compare a difference between the thickness of the internal defect layer calculated by the third module and the thickness of the internal defect layer calculated by the fourth module, and the thickness of the residual internal defect layer included in the pickled steel sheet. To train the fourth module, the first server 41 may receive a thickness of the residual internal defect layer measured by the external system for controlling the etching device in the pickled steel sheet.

In an embodiment, the calculation module stored in the storage device 43 may further include a fifth module generating control data necessary for the external system to control the etching device. The control data generated by the fifth module may include at least one of a speed at which the etching device transports the hot-rolled steel sheet, a concentration of an etching solution contacting the hot-rolled steel sheet in the etching device, a component of the etching solution, a temperature of the etching solution, or whether or not an accelerator is used.

In order for the training model to train the fifth module, the first server 41 may receive control data from the external system controlling the etching device. The control data received by the first server 41 from the external system may be control data measured by the external system from the etching device during the etching process. The training model may compare a thickness of the internal defect layer calculated by the fourth module using the control data received from the external system and a thickness of the residual internal defect layer measured from the pickled steel sheet, to train the fifth module.

FIG. 5 is a view illustrating an initial training method of a calculation module included in a process control system according to an embodiment of the present disclosure.

Referring to FIG. 5, a hot-rolled steel sheet internal defect layer thickness control system 100 may include a calculation module 110 and a training model 120. For example, the calculation module 110 may include a thickness information generating module 111 and a control data generating module 112. In an embodiment, the calculation module 110 may include first to fifth modules M1-M5, and the thickness information generating module 111 may include the first to third modules M1-M3, and the control data generating module 112 may include the fourth module M4 and the fifth module M5. The first to fifth modules M1-M5 may be implemented as hardware such as a circuit or the like, or may be implemented as software such as source code or the like.

For example, when the first to fifth modules M1-M5 are implemented as software such as source code or the like, the first to fifth modules M1-M5 may execute an operation calculating output data using input data. The operation of each of the first to fifth modules M1-M5 may be determined and optimized by the training model 120.

The training model 120 may include first to fourth training models LM1-LM4 and a feedback training model LMT. The first training model LM1 may be a model for initially training the first module M1, and the second training model LM2 may be a model for initially training the second module M2. Similarly, the third training model LM3 may be a model for initially training the third module M3, and the fourth training model LM4 may be a model for initially training the fourth module M4. The feedback training model LMT may be a model for training at least one of the first to fifth modules M1-M5 after completing an etching process. In an embodiment, the feedback training model LMT may simultaneously train the first to fifth modules M1-M5.

The training model 120 may train the first to fifth modules M1-M5 using a deviation correction method, reinforcement training, or the like. When the deviation correction method is used, the training model 120 may train the first to fifth modules M1-M5 in a manner that corrects an error between a measured value input externally and a calculated value output from a module. When the training model 120 uses reinforcement training, the training model 120 may be a deep neural network (DNN), but is not necessarily limited to such an example.

An embodiment in which the training model 120 trains each module using reinforcement training will be described later with reference to FIG. 6. Hereinafter, an initial training method of the process control system 100 will be described in detail with reference to FIG. 5.

In an embodiment, the first module M1 may calculate a phase fraction before winding a hot-rolled steel sheet. The first training model LM1 may receive a first process condition CD1 and a first phase fraction value EPF. The first phase fraction value EPF may include a phase transformation fraction, a phase transformation amount, or the like, actually measured under the first process condition CD1. The first process condition CD1 may include a cooling rate of the hot-rolled steel sheet, a temperature of the hot-rolled steel sheet, a component of the hot-rolled steel sheet, or the like.

The first training model LM1 may input the first process condition CD1 to the first module M1. The first module M1 may calculate a second phase fraction value PPF acquired by calculating a phase fraction of the hot-rolled steel sheet using the first process condition CD1. The second phase fraction value PPF output by the first module M1 may be transmitted to the first training model LM1.

The first training model LM1 may compare the first phase fraction value EPF and the second phase fraction value PPF to train the first module M1. For example, when the first phase fraction value EPF and the second phase fraction value PPF do not match, the first training model LM1 may receive the first process condition CD1 from the first module M1, to adjust a weight, a coefficient, or the like of a first operation for calculating the phase fraction. The first training model LM1 may adjust the weight, the coefficient, or the like of the first operation of the first module M1 such that the first phase fraction value EPF and the second phase fraction value PPF match, or a difference between the first phase fraction value EPF and the second phase fraction value PPF is less than or equal to a predetermined value.

The second training model LM2 may receive a second process condition CD2, an environmental condition FV indicating a surrounding environment, a first temperature value ET measured from the hot-rolled steel sheet, and the like. The second process condition CD2 may include a time point at which a temperature of the hot-rolled steel sheet, after winding, is measured, a component of the hot-rolled steel sheet, or the like. The environmental condition FV may include a value expressing a surrounding environment affecting a cooling rate of the hot-rolled steel sheet after winding. For example, when the surrounding environment is air, a value of the environmental condition FV may be '1,' when the surrounding environment is wind, a value of the environmental condition FV may be '2,' and when the surrounding environment is water, a value of the environmental condition FV may be '3.' The first temperature value ET may include a value actually measured at the temperature of the hot-rolled eedsteel sheet.

The second module M2 may receive the second process condition CD2 and the environmental condition FV, from the second training model LM2. For example, the second module M2 may calculate a temperature of the hot-rolled steel sheet using the second process condition CD2 and the environmental condition FV, and may output a second temperature value PT acquired by calculating the temperature of the hot-rolled steel sheet. The second temperature value PT may include a value acquired by calculating a temperature of each region defined in the length direction of the hot-rolled steel sheet, according to an elapsed time after winding, or the like. The second module M2 may output the second temperature value PT to the second training model LM2.

The second training model LM2 may compare the first temperature value ET and the second temperature value PT to train the second module M2. For example, when the first temperature value ET and the second temperature value PT do not match or a difference between the first temperature value ET and the second temperature value PT is greater than a predetermined value, the second training model LM2 may adjust a weight, a coefficient, or the like of a second operation for calculating the second temperature value PT in the second module M2. The second training model LM2 may adjust the weight, the coefficient, or the like of the second operation of the second module M2 such that the first temperature value ET and the second temperature value PT match, or a difference between the first temperature value ET and the second temperature value PT is less than or equal to a predetermined value.

The third training model LM3 may receive a component ING of the hot-rolled steel sheet, an oxygen partial pressure OPP around the hot-rolled steel sheet, the second temperature value PT, which may be an output value of the second module M2, a first thickness ED of an internal defect layer measured from the hot-rolled steel sheet, or the like. The first thickness ED of the internal defect layer may be an actually measured value in which a thickness of the internal defect layer of the hot-rolled steel sheet is actually measured.

The third module M3 may receive the component ING of the hot-rolled steel sheet, the oxygen partial pressure OPP around the hot-rolled steel sheet, and the second temperature value PT of the hot-rolled steel sheet from the third training model LM3, as input data. The third module M3 may calculate a second thickness PD of the internal defect layer. The second thickness PD may be a thickness of the internal defect layer calculated by the third module M3 to be present in the hot-rolled steel sheet, using at least one of the component ING of the hot-rolled steel sheet, the oxygen partial pressure OPP around the hot-rolled steel sheet, or the second temperature value PT. The second thickness PD of the internal defect layer output from the third module M3 may be transferred to the third training model LM3.

The third training model LM3 may compare the first thickness ED and the second thickness PD in the internal defect layer to train the third module M3. For example, when the first thickness ED and the second thickness PD in the internal defect layer do not match or a difference therebetween is greater than a predetermined value, the third training model LM3 may adjust a weight, a coefficient, or the like of a third operation for calculating the second thickness PD of the internal defect layer in the third module M3. The third training model LM3 may train the third module M3 such that the first thickness ED, which may be the measured value of the internal defect layer, and the second thickness PD, which may be the calculated value thereof, match or a difference therebetween is less than or equal to a predetermined value.

The fourth training model LM4 may receive a transporting speed PV of the hot-rolled steel sheet, characteristics AC of an etching solution used in an etching process, and a first thickness EPA of the internal defect layer removed by an etching device. The characteristics AC of the etching solution may include a concentration of the etching solution contacting the hot-rolled steel sheet, a temperature of the etching solution, a component of the etching solution, whether or not an accelerator is used, or the like. The transporting speed PV of the hot-rolled steel sheet may mean a speed at which the hot-rolled steel sheet moves while the hot-rolled steel sheet is in contact with the etching solution. The first thickness EPA of the internal defect layer may mean a thickness of the internal defect layer that may be actually removed in the etching process performed by the transporting speed PV of the hot-rolled steel sheet and the characteristics AC of the etching solution.

The fourth module M4 may receive the transporting speed PV of the hot-rolled steel sheet and the characteristics AC of the etching solution from the fourth training model LM4.

The fourth module M4 may calculate a second thickness PPA1 of the internal defect layer expected to be removed by the etching device, using at least one of the transporting speed PV of the hot-rolled steel sheet or the characteristics AC of the etching solution. In an embodiment, the fourth module M4 may receive an etching time determined according to the transporting speed PV and the characteristics AC of the etching solution, as an input value, and may use the input value to run an operation calculating the second thickness PPA1 of the internal defect layer. The fourth module M4 may output the second thickness PPA1 of the internal defect layer to the fourth training model LM4.

The fourth training model LM4 may compare the second thickness PPA1 of the internal defect layer and a first thickness EPA of the internal defect layer to train the fourth module M4. For example, when the first thickness EPA of the internal defect layer and the second thickness PPA1 of the internal defect layer do not match or a difference therebetween is greater than a predetermined value, the fourth training model LM4 may adjust a weight, a coefficient, or the like of a fourth operation for calculating the second thickness PPA1 of the internal defect layer in the fourth module M4.

The fifth module M5 may generate control data for controlling the etching device. For example, the fifth module M5 may find optimal control data by repeatedly calling the fourth module M4 using an optimization technique (e.g., a golden partition method or the like). The fifth module M5 may select an optimization technique for finding the optimal control data or may modify the optimization technique.

FIG. 6 is a view illustrating a training model included in a process control system according to an embodiment of the present disclosure.

Referring to FIG. 6, when a training model trains each module using reinforcement training, the training model may be implemented with a deep neural network (DNN) or the like. The training model may include an input layer IL, a hidden layer HL, and an output layer OL. For example, a plurality of nodes included in the input layer IL, the hidden layer HL, and the output layer OL may be fully connected to each other. The input layer IL may include a plurality of input nodes x1-xi, and the number of input nodes x1-xi may correspond to the number of input data. The output layer OL may include a plurality of output nodes y1-yj, and the number of output nodes y1-yj may correspond to the number of output data.

The hidden layer HL may include first to third hidden layers HL1 to HL3, and the number of the hidden layers HL1 to HL3 may be variously changed. As an example, the training model 120 may be trained by adjusting a weight of each of the hidden nodes included in the hidden layer HL.

FIG. 7 is a view illustrating a method of operating a process control system according to an embodiment of the present disclosure.

Referring to FIG. 7, a process control system 200 according to an embodiment of the present disclosure may include calculation modules 210 to 230. For example, the process control system may be connected to an external system directly controlling an etching device for removing at least a portion of an internal defect layer of a hot-rolled steel sheet through a network.

In an embodiment, the calculation modules 210 to 230 may calculate a thickness of the internal defect layer included in the hot-rolled steel sheet. In an embodiment, to calculate the thickness of the internal defect layer, a cooling rate of the hot-rolled steel sheet in a length direction of the hot-rolled steel sheet may be required. When a phase transformation is not completed before winding the hot-rolled steel sheet, heat may occur due to the phase transformation after winding. Therefore, it is possible to calculate a change in temperature of the hot-rolled steel sheet after winding in consideration of a phase fraction before the winding of the hot-rolled steel sheet.

In an embodiment, a first module 210 may calculate a phase fraction PPF according to a cooling time by using a first process condition CD1. The first process condition CD1 may include a cooling rate of the hot-rolled steel sheet, a temperature of the hot-rolled steel sheet, a component of the hot-rolled steel sheet, or the like.

In a hot-rolled steel sheet, a phase transformation from austenite to pearlite may occur during a cooling process, and transformation heat in which a temperature rises due to the phase transformation may occur. In hot-rolled high-carbon steel, the phase transformation may not be completed during cooling due to slow pearlite transformation, and additional phase transformation may occur in the hot-rolled steel sheet after winding. As a result, the hot-rolled steel sheet may be exposed to a high temperature oxidizing atmosphere for a long time after winding, and a thickness of the internal defect layer may increase.

A second module 220 may calculate a temperature PT according to an elapsed time after winding the hot-rolled steel sheet, by using a second process condition CD2 and an environmental condition FV. For example, the second module 220 may calculate the temperature PT in each region in the length direction of the hot-rolled steel sheet. The second process condition CD2 may include a time point at which the temperature of the hot-rolled steel sheet is measured after winding, the component of the hot-rolled steel sheet, or the like.

To calculate the temperature of the wound hot-rolled steel sheet, since the above-described transformation heat should also be considered, the second module 220 may receive the phase fraction PPF from the first module 210. Based on the phase fraction PPF, it is possible to know a phase fraction at the time of winding, an amount of phase transformation additionally occurring in the hot-rolled steel sheet after winding, or the like. Therefore, the second module 220 may calculate the temperature PT of the hot-rolled steel sheet according to the elapsed time after winding the hot-rolled steel sheet in consideration of the amount of phase transformation additionally occurring in the wound hot-rolled steel sheet. In an embodiment illustrated in FIG. 7, a time point t1 may represent a temperature at which transformation heat due to phase transformation may be reflected.

The third module 230 may calculate a thickness PD of the internal defect layer included in the hot-rolled steel sheet, using a component ING of the hot-rolled steel sheet, an oxygen partial pressure OPP around the hot-rolled steel sheet, or the like. In an embodiment, the third module 230 may receive the temperature PT according to the elapsed time after winding in each region of the hot-rolled steel sheet from the second module 220, and may calculate the thickness PD of the internal defect layer in each region of the hot-rolled steel sheet.

FIG. 8 is a flowchart illustrating a method of operating a process control system according to an embodiment of the present disclosure.

Referring to FIG. 8, a process control system may transmit at least a portion of calculation modules to an external system (S110). As an example, an entity transmitting the at least a portion of the calculation modules to the external system may be a system for producing a hot-rolled steel sheet and winding the hot-rolled steel sheet to form a hot-rolled coil. In addition, the external system receiving at least a portion of the calculation modules may be a system receiving the hot-rolled coil and performing an etching process.

The external system may perform the etching process using the calculation modules received in S110. For example, a calculation module transmitted to the external system in S110 may be a module generating control data for controlling the etching process. The process control system may receive, from the external system, a thickness of a residual internal defect layer included in a pickled steel sheet on which the etching process has been completed, control data measured by an etching device during the etching process, or the like (S120). For example, the control data received in S120 may be a value actually measured by the etching device, and thus may be different from a value input to the etching device by the external system to control the etching device.

The process control system may calculate a thickness of the internal defect layer expected to be removed by the etching device, using the control data received in S120 (S130). Also, the process control system may compare the thickness of the internal defect layer calculated in S130 and the thickness of the residual internal defect layer received in S120, and may train the calculation modules based on a comparison result (S140). The process control system may include a training model necessary for training of the calculation modules, and the training model may adjust a weight, a coefficient, or the like, used for an operation in at least one of the calculation modules.

When training is completed, the process control system may transmit at least one of the calculation modules to the external system (S150). The external system may be updated by overwriting a previously stored calculation module, or the like, using a calculation module received from the process control system. Therefore, the external system may perform the etching process in an optimized manner in consideration of thickness distribution of the internal defect layer included in the hot-rolled steel sheet.

FIG. 9 is a block diagram simply illustrating a process control system according to an embodiment of the present disclosure.

Referring to FIG. 9, a process control system 50 may include a second server 51 and an etching device 55, and the second server 51 may control and manage the etching device 55. The etching device 55 may receive a hot-rolled coil produced by the hot-rolled steel sheet production device 45, as described above, may unwind the hot-rolled coil to form a hot-rolled steel sheet, and may then perform an etching process on the hot-rolled steel sheet to produce a pickled steel sheet.

The etching device 55 may be at least one of a pickling device, a dry etching device, or a wet etching device. When the etching device 55 is the pickling device, an internal defect layer may be removed in such a manner that the hot-rolled steel sheet is immersed in an acidic etching solution. Alternatively, the internal defect layer may be removed by an etching solution sprayed onto a surface of the hot-rolled steel sheet, or the internal defect layer may be removed by brushing a surface of the hot-rolled steel sheet with a brush dipped in an etching solution.

The second server 51 may include a communication unit 52, a storage device 53, a processor 54, and the like. The communication unit 52 may connect the second server 51 and a network, to communicate each other, and, for example, the second server 51 may communicate with a first server 41 through the communication unit 52. As described above with reference to FIG. 4, a first server 41 may be a server controlling a hot-rolled steel sheet production device 45. The storage device 53 may store data required for operation of the second server 51 and control of the etching device 55. The processor 54 may control the communication unit 52, the storage device 53, the etching device 55, or the like.

In an embodiment, the storage device 53 may store control data necessary for controlling the etching device 55. For example, the control data stored in the storage device 53 may be data acquired by executing a calculation module stored in the storage device 53 by the processor 54, or data received from an external system connected through the communication unit 52. For example, when control data is stored in the storage device 53 without a calculation module, the control data may be transmitted from an external system managing production of the hot-rolled steel sheet.

The storage device 53 may include a calculation module generating control data. The calculation module may execute an operation for controlling the etching process performed in the etching device 55. For example, calculation modules may generate control data controlling the etching device 55 to efficiently remove an internal defect layer included in the hot-rolled steel sheet, in consideration of thickness distribution of the internal defect layer. In an embodiment, the calculation module stored in the storage device 53 may be a calculation module received and stored from an external system through the communication unit 52, and the external system may be a system for controlling the hot-rolled steel sheet production device. The external system may not be necessarily limited to the system for controlling the hot-rolled steel sheet production device, and may receive a calculation module from various external systems according to embodiments.

For example, in the calculation module, the second server 51 may generate control data using thickness information about the internal defect layer received through the communication unit 52. The processor 54 may acquire control data by inputting the thickness information about the internal defect layer to the calculation module stored in the storage device 53, and executing the calculation module. The thickness information about the internal defect layer may include a thickness distribution of the internal defect layer appearing in a length direction of the hot-rolled steel sheet.

According to embodiments, the calculation module stored in the storage device 53 may generate control data using information on the hot-rolled steel sheet received through the communication unit 52. In this case, the calculation module may calculate thickness information about the internal defect layer included in the hot-rolled steel sheet by using a phase fraction of the hot-rolled steel sheet, a temperature of the hot-rolled steel sheet, a component of the hot-rolled steel sheet, or the like. In addition, the calculation module may generate control data using the thickness information about the internal defect layer. For example, the calculation module stored in the storage device 53 may include a thickness information generating module for calculating thickness information, and a control data generating module for generating control data.

The control data may include at least one of a transporting speed at which the etching device 55 transports the hot-rolled steel sheet, a concentration of an etching solution contacting the hot-rolled steel sheet in the etching device 55, a temperature of the etching solution, a component of the etching solution, or whether or not an accelerator is used. For example, in thickness information about the internal defect layer, thicknesses of the internal defect layers in a first region and a second region of the hot-rolled steel sheet may be different. In this case, the first region and the second region may be regions defined at different positions in the length direction of the hot-rolled steel sheet.

In the control data, a first transporting speed of the hot-rolled steel sheet while the first region passes through the etching device 55 and is in contact with the etching solution may be different from a second transporting speed of the hot-rolled steel sheet while the second region passes through the etching device 55 and is in contact with the etching solution. For example, when a thickness of the internal defect layer of the first region is thinner than a thickness of the internal defect layer of the second region, the first transporting speed may be faster than the second transporting speed.

The calculation module for generating the control data may determine a transporting speed of the hot-rolled steel sheet according to a thickness of the internal defect layer. In an embodiment, the calculation module may determine a transporting speed of the hot-rolled steel sheet by executing a predetermined operation using a thickness of the internal defect layer. In addition, in an embodiment, the calculation module may compare a predetermined reference thickness and a thickness of the internal defect layer, and may determine a transporting speed of the hot-rolled steel sheet according to a comparison result.

In an embodiment, the second server 51 may acquire information necessary for updating the calculation module from the etching device 55, and may feedback the information acquired from the etching device 55 to an external system through the communication unit 52. In this case, the external system may be a system including a training model for storing and managing the calculation module and updating the calculation module. When the training model for updating the calculation module is included in the storage device 53, an operation of updating the calculation module using the information acquired from the etching device 55 may be executed in the second server 51.

For example, the external system may be a system for controlling a production process of the hot-rolled steel sheet. The external system may update at least a portion of calculation modules stored in the external system using the information fed back from the second server 51. For example, a weight, a coefficient, or the like, applied to at least a portion of the calculation modules stored in the external system to execute an operation, may be adjusted.

In addition, the external system may transmit at least one of updated calculation modules, for example, a calculation module generating control data, to the second server 51. The second server 51 may update an existing calculation module stored in the storage device 53 using a new calculation module received from the external system. For example, the second server 51 may update the calculation modules by overwriting the existing calculation module with the new calculation module. Therefore, the etching process may be performed using a calculation module optimized for various conditions of the etching device 55 and/or a hot-rolled steel sheet that may be the target of the etching process, and efficiency and productivity of the etching process may be improved.

In another embodiment, the second server 51 may acquire information necessary for updating the calculation modules from the etching device 55, and may directly update a calculation module storing the information acquired from the etching device 55 in the storage device 53. Also, as an example, the storage device 53 may store only control data for controlling the etching device 55 without a separate calculation module. In this case, the second server 51 may feedback information necessary for updating the calculation module acquired from the etching device 55 to the external system, may receive new control data generated by the calculation module updated in the external system, and may store the new control data in the storage device 53.

FIG. 10 is a view illustrating a method of operating a process control system according to an embodiment of the present disclosure.

Referring to FIG. 10, a process control system 300 may include calculation modules 310 and 320. For example, the calculation modules 310 and 320 may be modules stored and performed in the process control system 300 for controlling an etching device. Also, the calculation modules 310 and 320 may be stored in an external system connected to the process control system 300 through a network.

The calculation modules 310 and 320 may be transmitted to and stored in the process control system 300 in a state in which training is completed by a training model of the external system. In an embodiment, the calculation modules 310 and 320 stored and performed in the process control system 300 for controlling the etching device may be modules received from the external system. Referring to an embodiment illustrated in FIG. 5 as an example, among the calculation modules 110 illustrated in FIG. 5, the control data generating module 112 may be transmitted to and stored in the process control system 300 as the calculation modules 310 and 320.

The process control system 300 may determine control data for controlling the etching device. The process control system 300 may receive thickness information PD of an internal defect layer. The thickness information PD of the internal defect layer received by the process control system 300 may be a thickness of the internal defect layer calculated to be included in a hot-rolled steel sheet, similar to an embodiment described with reference to FIG. 9 above, and may include thickness distribution of the internal defect layer according to a region of the hot-rolled steel sheet. The process control system 300 may calculate control data PPV2 based on the thickness information PD of the internal defect layer.

In an embodiment, the calculation modules 310 and 320 may include a first module 310, a second module 320, and the like. The second module 320 may receive the thickness information PD of the internal defect layer. The thickness information PD of the internal defect layer may be a thickness of the internal defect layer expected to exist in the hot-rolled steel sheet, and may not exactly match a thickness of the internal defect layer that may be actually present in the hot-rolled steel sheet. Also, the second module 320 may receive a target thickness value GD of a residual internal defect layer. The residual internal defect layer may be an internal defect layer existing in a pickled steel sheet on which the etching process has been completed. For example, when the internal defect layer is completely removed by the etching process, the target thickness value GD of the residual internal defect layer may be 0. According to some embodiments, the target thickness GD of the residual internal defect layer may be greater than zero. The second module 320 may calculate an optimal control data PPV2 by periodically calling the first module 310.

The second module 320 may output an initial value of the control data to the first module 310. The initial value of the control data may include characteristics AC of an etching solution measured from a tank containing the etching solution in the etching device, a transporting speed PPV1 of the hot-rolled steel sheet, or the like. The initial value of the control data may be determined as an arbitrary value or may be determined by a value measured in real time from the etching device. When the initial value of the control data is arbitrarily determined, the initial value of the control data may be determined by an external system operating the hot-rolled steel sheet production device or a process control system operating the etching device. The first module 310 may calculate a thickness PPA2 of the internal defect layer expected to be removed by the etching device, using at least one of the characteristics AC of the etching solution or the transporting speed PPV1.

The second module 320 may receive the thickness PPA2 of the internal defect layer from the first module 310. The second module 320 may determine whether the characteristics AC of the etching solution and an arbitrarily set transporting speed PPV1 match the optimal control data PPV2, based on the thickness PPA2 of the internal defect layer. As an example, the second module 320 may compare a difference between the thickness information PD of the internal defect layer and the target thickness GD of the residual internal defect layer, and the thickness PPA2 of the internal defect layer calculated by the first module 310. When comparison results do not match, the second module 320 may adjust at least one of the characteristics AC of the etching solution or the transporting speed PPV1, to be input to the first module 310. In the same manner as described above, until a difference between the thickness information PD of the internal defect layer and the target thickness GD of the residual internal defect layer matches the thickness PPA2 of the internal defect layer calculated by the first module 310, or the difference is less than or equal to a predetermined value, the second module 320 may call the first module 310 while changing at least one of the characteristics AC of the etching solution or the transporting speed PPV1.

[Table 1] may be a table illustrating how the second module 320 generates the optimal control data PPV2. For convenience of explanation, it is assumed in [Table 1] that the characteristics AC of the etching solution are constant. The second module 320 may calculate a target removal thickness GPA indicating how much of the internal defect layer should be removed, based on the difference between the thickness information PD of the internal defect layer expected to exist in the hot-rolled steel sheet and the target thickness GD of the residual internal defect layer.

A region X, a region Y, and a region Z, defined in [Table 1], may be regions defined at different positions in a length direction of the hot-rolled steel sheet. For example, region X and region Z may be adjacent to an end portion of the hot-rolled steel sheet in the length direction, as compared to region Y. For example, region Y may be disposed between region X and region Z in the length direction. Referring to [Table 1], the target removal thickness GPA in the first region may be determined as 1 μm (=3 μm−2 μm), which may be a difference between the thickness information PD of the internal defect layer calculated to be present in the hot-rolled steel sheet and the target thickness GD of the residual internal defect layer.

Referring to [Table 1], in the first module 310, when the transporting speed PPV1 is 15 mpm, the thickness PPA2 of the internal defect layer expected to be removed by the etching device may be 2 μm. Since the thickness PPA2 of the internal defect layer expected to be removed by the etching device may be greater than the target removal thickness GPA, the second module 320 may increase the transporting speed PPV1 to 20 mpm, which may be faster than 15 mpm, to be output to the first module 310. When the transporting speed PPV1 is 20 mpm, and the thickness PPA2 of the internal defect layer expected to be removed by the etching device is calculated by the first module 310 as a value, different from 1 μm, the second module 320 may change the transporting speed PPV1 again to a value, different from 20 mpm, to be output to the first module 310. When the transporting speed PPV1 is 20 mpm, and the thickness PPA2 of the internal defect layer calculated by the first module 310 is 1 μm), the second module 320 may determine an optimal transporting speed for region X of the hot-rolled steel sheet to be 20 mpm, since the thickness PPA2 of the internal defect layer expected to be removed by the etching device may match the target removal thickness GPA.

TABLE 1

|      | Region X | Region Y | Region Z |
|------|----------|----------|----------|
| PD   | 3 μm     | 10 μm    | 3 μm     |
| GD   | 2 μm     | 2 μm     | 2 μm     |
| GPA  | 1 μm     | 8 μm     | 1 μm     |
| PPV1 | 15 mpm   | 10 mpm   | 15 mpm   |
| PPA2 | 2 μm     | 4 μm     | 2 μm     |
| PPV2 | 20 mpm   | 5 mpm    | 20 mpm   | mpm = meters per minute

In an embodiment illustrated in FIG. 10, it has been described that the calculation modules 310 and 320 of the process control system 300 generate control data, but are not necessarily limited thereto. According to embodiments, calculation modules of the external system connected to the process control system 300 through the network may generate control data. In this case, the process control system 300 may receive the control data generated by the external system through the network, and may control the etching device using the received control data.

Therefore, the process control system 300 may generate control data including the transporting speed of the hot-rolled steel sheet based on the thickness information PD of the internal defect layer. For example, in the hot-rolled steel sheet, a thickness of the internal defect layer may be changed according to a plurality of regions defined in the length direction as described above. For example, a thickness of the internal defect layer included in the regions cooled while exposed externally may be thinner than a thickness of the internal defect layer included in the regions cooled slowly while not exposed externally.

For example, the etching process may be performed by sufficiently contacting the hot-rolled steel sheet with the etching solution, regardless of the region of the hot-rolled steel sheet, such that the internal defect layer included in the hot-rolled steel sheet is sufficiently removed. The above method may lead to an increase in time of the etching process and/or an increase in amount of an etching solution input to the etching process, to reduce productivity.

According to an embodiment of the present disclosure, a thickness of the internal defect layer may be calculated in a length direction of the hot-rolled steel sheet, and control data for optimally controlling the etching process according to calculated thickness information about the internal defect layer may be calculated. Therefore, productivity may be improved by shortening a time period of the etching process and reducing an amount of the etching solution used. In addition, it is possible to reduce thickness variations of the internal defect layer appearing in the length direction in the pickled steel sheet in which the etching process has been completed.

For example, in the length direction of the hot-rolled steel sheet, a region in which a thickness of the internal defect layer is thinner than a preset reference thickness t may be defined as a first region, and a region in which a thickness of the internal defect layer is thicker than the reference thickness t may be defined as a second region. In this case, a transporting speed of the hot-rolled steel sheet while the first region is in contact with the etching solution may be faster than a transporting speed of the hot-rolled steel sheet while the second region is in contact with the etching solution. Alternatively, a transporting speed for each of the first region and the second region may be determined by an operation of receiving a thickness of the internal defect layer to determine the transporting speed, without setting a separate reference thickness t.

As a result, the second region may be in contact with the etching solution for a longer time period, as compared to the first region. Therefore, it is possible to minimize thickness variations of the residual internal defect layer included in the pickled steel sheet in which the etching process has been completed.

In some embodiments, the reference thickness t may be set in plurality. For example, when the reference thickness is provided as two reference thicknesses t1 and t2, the hot-rolled steel sheet may be divided into at least three (3) regions according to a thickness of the internal defect layer. For example, when the reference thickness is provided as n reference thicknesses, the hot-rolled steel sheet may be divided into n+1 regions. When magnitudes of the reference thickness are defined as in Equation 1, transporting speeds at which the hot-rolled steel sheet may be transported while each of n+1 regions included in the hot-rolled steel sheet is in contact with the etching solution may be defined as in Equation 2 below.

$$t1 < t2 < t3 < \ldots < t0 \qquad \text{[Equation 1]}$$

$$\text{Transporting Speed in First Region} > \text{Transporting Speed in Second Region} > \ldots > \text{Transporting Speed in } n+1 \text{ Region} \qquad \text{[Equation 2]}$$

In some embodiments, an etching rate may be adjusted, in addition to the transporting speed of the hot-rolled steel sheet. For example, a region having a relatively small internal defect layer thickness may be brought into contact with an etching solution having a low etching rate, and a region having a relatively large internal defect layer thickness may be brought into contact with an etching solution having a high etching rate. Alternatively, the etching rate may be adjusted by changing an area of a brush to which the etching solution is applied, a pressure of the brush, or the like.

FIG. 11 is a view illustrating a training method of a calculation module included in a process control system according to an embodiment of the present disclosure. FIG. 12 is a view illustrating an etching process according to an embodiment of the present disclosure. FIG. 13 is a graph illustrating an etching process according to an embodiment of the present disclosure.

First, referring to FIG. 12, an etching device 500 may perform an etching process according to the control data PPV2, determined by an embodiment described with reference to FIG. 10, to remove at least a portion of an internal defect layer of a hot-rolled steel sheet 510. Referring to FIG. 12, while the etching device 500 performs the etching process, measuring instruments MI1 and MI2 may measure a thickness ERD of a residual internal defect layer in at least a portion of a pickled steel sheet 520 in which the etching process has been completed, and control data EPV may be collected from a tank TK or the like in which the etching process is performed. For example, the thickness ERD of the residual internal defect layer may be measured in a plurality of regions, and thus position information PI may be collected together. Control data EPV collected by a first measuring instrument MI1 may be control data EPV actually measured by the etching device 500 including the tank TK, and may have a value, different from control data PPV2 input to the etching device 500 due to a mechanical error, signal delay, a process error, or the like. The first measuring instrument MI1 may acquire at least one of a transporting speed of the hot-rolled steel sheet 510 and a characteristic of an etching solution contacting the hot-rolled steel sheet 510 in the tank TK.

Referring to FIG. 12, the etching device 500 may include a coiler CL, an uncoiler UCL, a tank TK, a first measuring instrument MI1, a second measuring instrument MI2, and the like. The uncoiler UCL may unwind a hot-rolled coil HC into the tank TK, to introduce the hot-rolled steel sheet 510 having a strip shape. The hot-rolled steel sheet 510 may be etched while passing through an etching solution accommodated in the tank TK. Alternatively, while the hot-rolled steel sheet 510 passes through the tank TK, the hot-rolled steel sheet 510 may be etched by an etching solution sprayed around the hot-rolled steel sheet 510 and/or a brush dipped in the etching solution.

While the etching process is in progress, the etching device 500 may be controlled according to the control data PPV2. For example, according to the control data PPV2, a transporting speed of the hot-rolled steel sheet 510 may be changed in each region in a length direction of the hot-rolled steel sheet 510. The first measuring instrument MI1 connected to the tank TK may measure the control data EPV at at least one measurement time point while the etching device 500 performs the etching process. As described above, at least a portion of the control data PPV2 input to the etching device 500 or the control data EPV measured by the first measuring instrument MI1 from the etching device 500 due to a mechanical error, operation delay, or the like may have different values. The first measuring instrument MI1 may transmit the measured control data EPV to an external system 400.

Referring to FIG. 11, an external system 400 may be a system for managing calculation modules 410 (411-415), and may include a training model LMT for training and updating the calculation modules 410. For example, the external system 400 may update the calculation modules 410 using information collected by first and second measuring instruments MI1 and MI2 in an etching device 500. The etching device 500 may be controlled, according to control data generated by the calculation modules 410 updated by the external system 400, to operate the etching device 500 in an optimal state.

In an embodiment illustrated in FIG. 13, a horizontal axis indicates a position in a length direction of a hot-rolled steel sheet, and a vertical axis indicates a thickness PD of an internal defect layer, and a transporting speed. For example, the thickness information PD of the internal defect layer may be a value calculated to be present in the hot-rolled steel sheet by at least a portion of calculation modules 410 included in an external system 400.

Referring to FIG. 13, the thickness PD of the internal defect layer may be calculated to be greater in a region Y, as compared to regions X and Z. Region X, region Y, and region Z may be regions that appear sequentially in the length direction, similar to those described with reference to Table 1 above, and region X and region Z may be regions closer to an end portion of the hot-rolled steel sheet in the length direction, as compared to region Y. Region Y may be a region between region X and region Z.

In an embodiment, the calculation modules 410 of the external system 400 may calculate a transporting speed OPV for the hot-rolled steel sheet from the thickness PD of the internal defect layer. The transporting speed OPV may be a speed at which the hot-rolled steel sheet 510 is actually transported in an etching device 500 when an etching process is performed according to control data PPV2 input to the etching device 500. Since a thickness of the internal defect layer in region Y may be calculated to be greater than those in regions X and Z, the transporting speed OPV may be relatively slow, while region Y is in contact with an etching solution, such that the internal defect layer in region Y may be sufficiently removed.

An actual transporting speed EPV may be a value actually measured by the etching device 500 in which the etching process is performed based on the transporting speed OPV. The actual transporting speed EPV may reflect situations such as errors, operation delays, or the like of the etching device 500, and thus may be different from the transporting speed OPV set by the control data PPV2.

For example, to completely remove the internal defect layer, the etching process may be performed while maintaining a transporting speed TPV uniformly based on the thickness of the internal defect layer present in a second region D2. In this case, a progress rate of the etching process may be reduced, and thus productivity may be reduced. According to an embodiment of the present disclosure, the etching process may be performed by applying a transporting speed OPV differently calculated in each region of the hot-rolled steel sheet. Therefore, it is possible to efficiently remove the internal defect layer, as well as reduce a time period of the etching process and an amount of the etching solution input to the etching process. Therefore, productivity of the etching process may be improved.

Referring back to FIG. 12, before the etching device 500 winds up the pickled steel sheet 520 etched using the coiler CL to manufacture a pickled coil PC, the second measuring instrument MI2 may measure position information PI of the pickled steel sheet 520 and a thickness ERD of the residual internal defect layer at a position corresponding to the position information PI.

According to an embodiment, at least one measurement position may be designated on the etched pickled steel sheet 520, and a sample may be collected by cutting a portion of the pickled steel sheet 520 at the measurement position. A cross-section of the sample, taken from the pickled steel sheet 520, may be observed under a microscope, to measure a thickness of the residual internal defect layer may. The measurement position may correspond to the position information PI of the pickled steel sheet 520, and may correspond to the thickness ERD of the residual internal defect layer at a position corresponding to the position information PI.

Referring back to FIG. 11, a training model 420 may receive a thickness ERD of the residual internal defect layer measured by the second measuring instrument MI2 of the etching device 500 at at least one measurement position of the pickled steel sheet 520. A fifth module 415 may receive actually measured control data EPV from the etching device 500 while the etching process is in progress. For example, the fifth module 415 may receive the actually measured control data EPV from the process control system including the etching device 500 through a network.

The fifth module 415 may output the actually measured control data EPV to a fourth module 414. The fourth module 414 may calculate a thickness PPA2 of the internal defect layer expected to be removed by the etching device 500, based on the actually measured control data EPV. The fifth module 415 may receive the thickness PPA2 of the internal defect layer from the fourth module 414. The fifth module MS415 may calculate an expected thickness PRD of the residual internal defect layer, based on the thickness PPA2 of the internal defect layer expected to be removed by the etching device 500. The expected thickness PRD of the residual internal defect layer may be a thickness of the internal defect layer expected to remain in the pickled steel sheet 520, after performing the etching process according to the measured control data EPV.

The training model LMT may receive the expected thickness PRD of the internal defect layer from the fifth module 415. The training model LMT may compare the thickness ERD of the residual internal defect layer actually measured from the pickled steel sheet 520 and the expected thickness PRD of the residual internal defect layer. The training model LMT may train at least one of the calculation modules 411-415 such that the thickness ERD of the residual internal defect layer measured from the pickled steel sheet 520 and the expected thickness PRD of the residual internal defect layer match or a difference therebetween is less than or equal to a predetermined value. For example, the training model LMT may train all of the calculation modules 411-415 at the same time, or may selectively train only a specific model.

According to embodiments, the process control system 50 of FIG. 9 including the server and the etching device may include a training model. The training model included in the process control system 50 of FIG. 9 may train the calculation module included in the process control system 50 of FIG. 9. Hereinafter, a method in which the training model of the process control system 50 of FIG. 9 trains the calculation module included in the process control system 50 of FIG. 9 will be described with reference to FIGS. 14 and 15.

FIG. 14 is a view illustrating an initial training method of a calculation module included in a process control system according to an embodiment of the present disclosure.

Referring to FIG. 14, a process control system 600 may include a calculation module 610 and a training model 620, and the calculation module 610 and the training model 620 may be stored in a storage device. For example, the calculation module 610 may be a control data generating module. The training model 620 may include a first training model LM1 and a feedback training model LMT. The first training model LM1 may be a model for initially training a first module M1, and the feedback training model LMT may be a model for training at least one of a first module M1 or a second module M2, after an etching process is completed. In an embodiment, the feedback training model LMT may simultaneously train the first module M1 and the second module M2. Also, according to embodiments, one training model may perform both training of the first module M1 and the second module M2, without distinction between the first training model LM1 and the feedback training model LMT.

The first training model LM1 may receive a transporting speed PV of a hot-rolled steel sheet, characteristics AC of an etching solution used in the etching process, a first thickness EPA of an internal defect layer removed by an etching device, or the like. The characteristics AC of the etching solution may include a concentration of the etching solution contacting the hot-rolled steel sheet, a temperature of the etching solution, a component of the etching solution, whether or not an accelerator is used, or the like. The transporting speed PV of the hot-rolled steel sheet may mean a speed at which the hot-rolled steel sheet moves while the hot-rolled steel sheet is in contact with the etching solution. The first thickness EPA of the internal defect layer may mean a thickness of the internal defect layer that may be actually removed in the etching process performed by the transporting speed PV of the hot-rolled steel sheet and the characteristics AC of the etching solution.

The first module M1 may receive the transporting speed PV of the hot-rolled steel sheet and the characteristics AC of the etching solution from the first training model LM1. The first module M1 may calculate a second thickness PPA1 of the internal defect layer expected to be removed by the etching device, using at least one of the transporting speed PV of the hot-rolled steel sheet or the characteristics AC of the etching solution. In an embodiment, the first module M1 may receive an etching time determined according to the transporting speed PV and the characteristics AC of the etching solution, as an input value, and may use the input value to run an operation calculating the second thickness PPA1 of the internal defect layer. The first module M1 may output the second thickness PPA1 of the internal defect layer to the first training model LM1.

The first training model LM1 may compare the second thickness PPA1 of the internal defect layer and a first thickness EPA of the internal defect layer to train the first module M1. For example, when the first thickness EPA of the internal defect layer and the second thickness PPA1 of the internal defect layer do not match or a difference therebetween is greater than a predetermined value, the first training model LM1 may adjust a weight, a coefficient, or the like of a first operation for calculating the second thickness PPA1 of the internal defect layer in the first module M1.

The second module M2 may generate control data for controlling the etching device. For example, the second module M2 may find optimal control data by repeatedly calling the first module M1 using an optimization technique (e.g., a golden partition method or the like). The second module M2 may select an optimization technique for finding the optimal control data or may modify the optimization technique.

FIG. 15 is a view illustrating a training method of a calculation module included in a process control system according to an embodiment of the present disclosure.

Referring to FIG. 15, a process control system 700 may be a system for managing calculation modules 710 (711 and 712), and may include a training model LMT for training the calculation modules 710. For example, the process control system 700 may train the calculation modules 710 using information collected by first and second measuring instruments MI1 and MI2 in an etching device 500. The etching device 500 may be controlled by control data generated by the calculation modules 710 for which training has been completed, to operate the etching device 500 in an optimal state.

A training model 720 may receive a thickness ERD of a residual internal defect layer measured by the second measuring instrument MI2 of the etching device 500 at at least one measurement position of a pickled steel sheet 520. A second module 712 may receive actually measured control data EPV from the etching device 500 while an etching process is in progress.

The second module 712 may output the actually measured control data EPV to a first module 711. The first module 711 may calculate a thickness PPA2 of an internal defect layer expected to be removed by the etching device 500, based on the actually measured control data EPV. The second module 712 may receive the thickness PPA2 of the internal defect layer from the first module 711. The second module M2712 may calculate an expected thickness PRD of the residual internal defect layer, based on the thickness PPA2 of the internal defect layer expected to be removed by the etching device 500. The expected thickness PRD of the residual internal defect layer may be a thickness of the internal defect layer expected to remain in the pickled steel sheet 520, after performing the etching process according to the measured control data EPV.

The training model LMT may receive the expected thickness PRD of the internal defect layer from the second module 712. The training model LMT may compare the thickness ERD of the residual internal defect layer actually measured from the pickled steel sheet 520 and the expected thickness PRD of the residual internal defect layer. The training model LMT may train at least one of the calculation modules 711 and 712 such that the thickness ERD of the residual internal defect layer measured from the pickled steel sheet 520 and the expected thickness PRD of the residual internal defect layer match or a difference therebetween is less than or equal to a predetermined value. For example, the training model LMT may train all of the calculation modules 712 and 712 at the same time, or may selectively train only a specific model.

FIG. 16 is a flowchart illustrating a method of operating a process control system according to an embodiment of the present disclosure.

Referring to FIG. 16, a process control system for controlling an etching process may receive a calculation module from an external system (S210). The calculation module received in S210 may generate control data for controlling the etching process. The process control system may perform the etching process using the control data generated by the calculation module (S220). At least a portion of an internal defect layer included in a hot-rolled steel sheet may be removed by the etching process.

The process control system may transmit control data actually measured by an etching device performing the etching process and a thickness of a residual internal defect layer included in a pickled steel sheet on which the etching process has been completed, to an external system (S230). The control data transmitted to the external system in S230 may be a value actually measured by the etching device. The thickness of the residual internal defect layer may be measured by taking a partial region of the pickled steel sheet as a sample and inspecting the same under a microscope.

The external system may train the calculation modules using the control data and the thickness of the residual internal defect layer, received in S230, or the like. When the training is completed, the process control system may receive at least one of calculation modules, in which the training has been completed, from the external system (S240). The process control system may update the existing calculation module with the calculation module received in S240 (S250). Therefore, it is possible to accurately control the etching process by reflecting process errors that may occur in the etching device, or the like.

For example, the external system may refer to a system for managing and controlling a production process of a hot-rolled steel sheet. This is illustrative, and the claims are not limited thereto.

FIG. 17 is a view illustrating a method of operating a process control system according to an embodiment of the present disclosure.

Referring to FIG. 17, a first system SYS1 for manufacturing a hot-rolled steel sheet may generate thickness information PD of an internal defect layer (S310). The thickness information PD of the internal defect layer generated in S310 may be a thickness of the internal defect layer calculated based on at least one of a temperature according to an elapsed time after winding, a component of the hot-rolled steel sheet, or an oxygen partial pressure around the hot-rolled steel sheet, measured in each region of the hot-rolled steel sheet defined in a length direction. The first system SYS1 may transmit the thickness information PD of the internal defect layer to a second system SYS2 through a network (S320).

The second system SYS2 may generate control data PPV for controlling an etching process of the hot-rolled steel sheet, using the thickness information PD of the internal defect layer (S330). The second system SYS2 may perform an etching process of removing at least a portion of the internal defect layer of the hot-rolled steel sheet, according to the control data PPV (S340). During the etching process, the second system SYS2 may acquire position information PI indicating a specific position of the hot-rolled steel sheet, a thickness ERD of a residual internal defect layer measured at a position corresponding to the position information PI, control data EPV, or the like (S350). The control data EPV acquired in S350 may be data actually measured from an etching device during the etching process, and may not match the control data PPV generated in S330 due to various factors such as a process error, signal delay, or the like. The second system SYS2 may transmit the information acquired in S350 to the first system SYS1 (S360).

The first system SYS1 may calculate an expected thickness PRD of the residual internal defect layer, using the information received in S360 (S370). The first system SYS1 may compare the expected thickness PRD of the residual internal defect layer calculated in S370 and the thickness ERD of the residual internal defect layer actually measured at at least one position (S380). The first system SYS1 may train at least one of calculation modules included in the first system SYS1 such that the estimated thickness PRD of the residual internal defect layer calculated at a specific position of the hot-rolled steel sheet and the thickness ERD of the measured residual internal defect layer match or a difference therebetween is less than or equal to a predetermined value (S390).

The first system SYS1 may transmit at least one of the trained calculation modules to the second system SYS2 (S400). The second system SYS2 may update the calculation module previously stored in the second system SYS2, using the calculation module received from the first system SYS1 (S410).

The present disclosure is not limited by the above-described embodiments and the accompanying drawings, but is intended to be limited by the appended claims. Therefore, various types of substitution, modification, and change will be possible by those skilled in the art within the scope not departing from the technical spirit of the present disclosure described in the claims, and will also fall within the scope of the present disclosure.

The invention claimed is:

1. A process control system comprising:
a storage device storing a calculation module generating thickness information about an internal defect layer included in a carbon steel product, based on at least one of a component, a cooling rate, a phase fraction, or a temperature of the carbon steel product;
a communication unit connected to a network; and
a processor transmitting at least one of the thickness information about the internal defect layer or control data for controlling an etching process removing at least a portion of the internal defect layer, to an external server controlling the etching process, through the communication unit;
wherein the calculation module comprises a first module calculating a phase fraction before winding the carbon steel product,
wherein the processor compares a phase fraction measured in the carbon steel product, and a phase fraction calculated by the first module from at least one of the temperature of the carbon steel product or the component of the carbon steel product, to train the first module.

2. A process control system comprising:
a storage device storing a calculation module generating thickness information about an internal defect layer included in a carbon steel product, based on at least one of a component, a cooling rate, a phase fraction, or a temperature of the carbon steel product;
a communication unit connected to a network; and
a processor transmitting at least one of the thickness information about the internal defect layer or control data for controlling an etching process removing at least a portion of the internal defect layer, to an external server controlling the etching process, through the communication unit;
wherein the calculation module comprises a first module calculating a phase fraction before winding the carbon steel product, a second module calculating a change in temperature of the carbon steel product, and a third module calculating a thickness of the internal defect layer included in the carbon steel product,
wherein the processor compares a thickness of the internal defect layer calculated by the third module using at least one of a change in temperature calculated according to the elapsed time after winding the carbon steel product, the component of the carbon steel product, or an oxygen partial pressure around the carbon steel product, and a thickness of the internal defect layer measured from the carbon steel product, to train the third module,
wherein the third module calculates a thickness of the internal defect layer in each of a plurality of regions distinguished in a length direction of the carbon steel product.

3. A process control system comprising:
a storage device storing a calculation module generating thickness information about an internal defect layer included in a carbon steel product, based on at least one of a component, a cooling rate, a phase fraction, or a temperature of the carbon steel product;
a communication unit connected to a network; and
a processor transmitting at least one of the thickness information about the internal defect layer or control data for controlling an etching process removing at least a portion of the internal defect layer, to an external server controlling the etching process, through the communication unit;
wherein the calculation module comprises a first module calculating a phase fraction before winding the carbon steel product, a second module calculating a change in temperature of the carbon steel product, a third module calculating a thickness of the internal defect layer included in the carbon steel product, a fourth module calculating a thickness of the internal defect layer to be removed in the etching process, based on the control data, and a fifth module generating the control data,
wherein the processor compares a thickness of the internal defect layer calculated by the fourth module using the control data measured by the external server from an etching device performing the etching process, and a thickness of the residual internal defect layer measured from the pickled carbon steel product on which the etching process is completed, to train the calculation module.

* * * * *